United States Patent
Lemar et al.

(10) Patent No.: US 9,223,500 B1
(45) Date of Patent: Dec. 29, 2015

(54) FILE CLONES IN A DISTRIBUTED FILE SYSTEM

(75) Inventors: Eric Michael Lemar, Seattle, WA (US); Matthew D. Fleming, Seattle, WA (US); Asif Arif Daud, Issaquah, WA (US); Mohd Fahadullah, Seattle, WA (US); Ronald Stuart Steinke, Covington, WA (US); Justin Michael Husted, Seattle, WA (US)

(73) Assignee: EMC CORPORATION, Hopkinton, MA (US)

(*) Notice: Subject to any disclaimer, the term of this patent is extended or adjusted under 35 U.S.C. 154(b) by 269 days.

(21) Appl. No.: 13/538,789

(22) Filed: Jun. 29, 2012

(51) Int. Cl.
*G06F 12/00* (2006.01)
*G06F 13/00* (2006.01)
*G06F 13/28* (2006.01)
*G06F 3/06* (2006.01)

(52) U.S. Cl.
CPC .............. *G06F 3/0608* (2013.01); *G06F 3/067* (2013.01); *G06F 3/0641* (2013.01); *G06F 3/064* (2013.01); *G06F 3/0643* (2013.01)

(58) Field of Classification Search
CPC . G06F 11/14; G06F 11/1446; G06F 11/1464; G06F 3/0643; G06F 3/0608; G06F 3/067; G06F 3/064; G06F 3/0641
USPC ........... 711/161–162; 712/228; 707/781, 782, 707/783, 784, 785, 786, 787, 788, 789, 707/821–831, E17.01, 999.202, 999.001, 707/999.2, 999.01, 999.102
See application file for complete search history.

(56) References Cited

U.S. PATENT DOCUMENTS

| | | | |
|---|---|---|---|
| 8,341,363 B2 | 12/2012 | Chou et al. | |
| 2006/0053259 A1* | 3/2006 | Berkowitz et al. | 711/162 |
| 2009/0043978 A1* | 2/2009 | Sawdon et al. | 711/162 |
| 2011/0258461 A1 | 10/2011 | Bates | |

OTHER PUBLICATIONS

Official Communication received for U.S. Appl. No. 13/452,491 mailed Dec. 31, 2013.

* cited by examiner

*Primary Examiner* — Sanjiv Shah
*Assistant Examiner* — Shane Woolwine
(74) *Attorney, Agent, or Firm* — Sean Evans; Jason A. Reyes; Krishnendu Gupta

(57) ABSTRACT

Embodiments are directed towards cloning files in a distributed file system. In response to a request to create file clones, a file cloning application can be employed to generate file clones based on a source file. The file cloning application can generate a new inode for each new file clone and at least one new shadow store. Data blocks from the source file can be transferred to the shadow store. The transferred data blocks can be replaced with reference blocks that point to the data blocks transferred to the shadow store. Likewise, additional reference blocks pointing to data blocks in the shadow store can be generated for the new file clone inodes. Further, the shadow store can maintain reference counters that track the number of reference blocks pointing to each shadow store block. Also, file clones can be generated based on a point-in-time snapshot of the source file.

24 Claims, 22 Drawing Sheets

|  | Delta Read | Delta Write | Shared | Exclusive |
|---|---|---|---|---|
| Delta Read | yes | yes | yes | no |
| Delta Write | yes | yes | no | no |
| Shared | yes | no | yes | no |
| Exclusive | no | no | no | no |

FILE CLONES IN A DISTRIBUTED FILE SYSTEM

TECHNICAL FIELD

The various embodiments relate generally to managing access to files in a file system, and more particularly to, improving performance by enabling improved file copying.

BACKGROUND

High performance computing environments often require distributed high performance file systems. Such file systems may be responsible for storing and managing access to millions of files. In some cases, such file systems may have to provide files for thousands, or even millions of simultaneous users. Additionally, high performance file systems may be required to support very large files.

Accordingly, naively performing standard file operations may unacceptably impact performance. Standard file locking procedures may significantly impact performance and/or negatively effect user experience. Also, naively locking and/or copying very large files may take too long and/or consume too many system resources. Further, naively duplicating large files may unnecessarily consume large amounts of storage space. For example, users often create duplicate files where the duplicate files continue to share the bulk of their content. Thus, naïve duplication may generate unnecessarily duplicative file portions. Consequently, systems that can manage large and/or distributed file systems are the subject of considerable innovation.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Description Of The Various Embodiments, which is to be read in association with the accompanying drawings, wherein.

DESCRIPTION OF THE VARIOUS EMBODIMENTS

Figure 1:
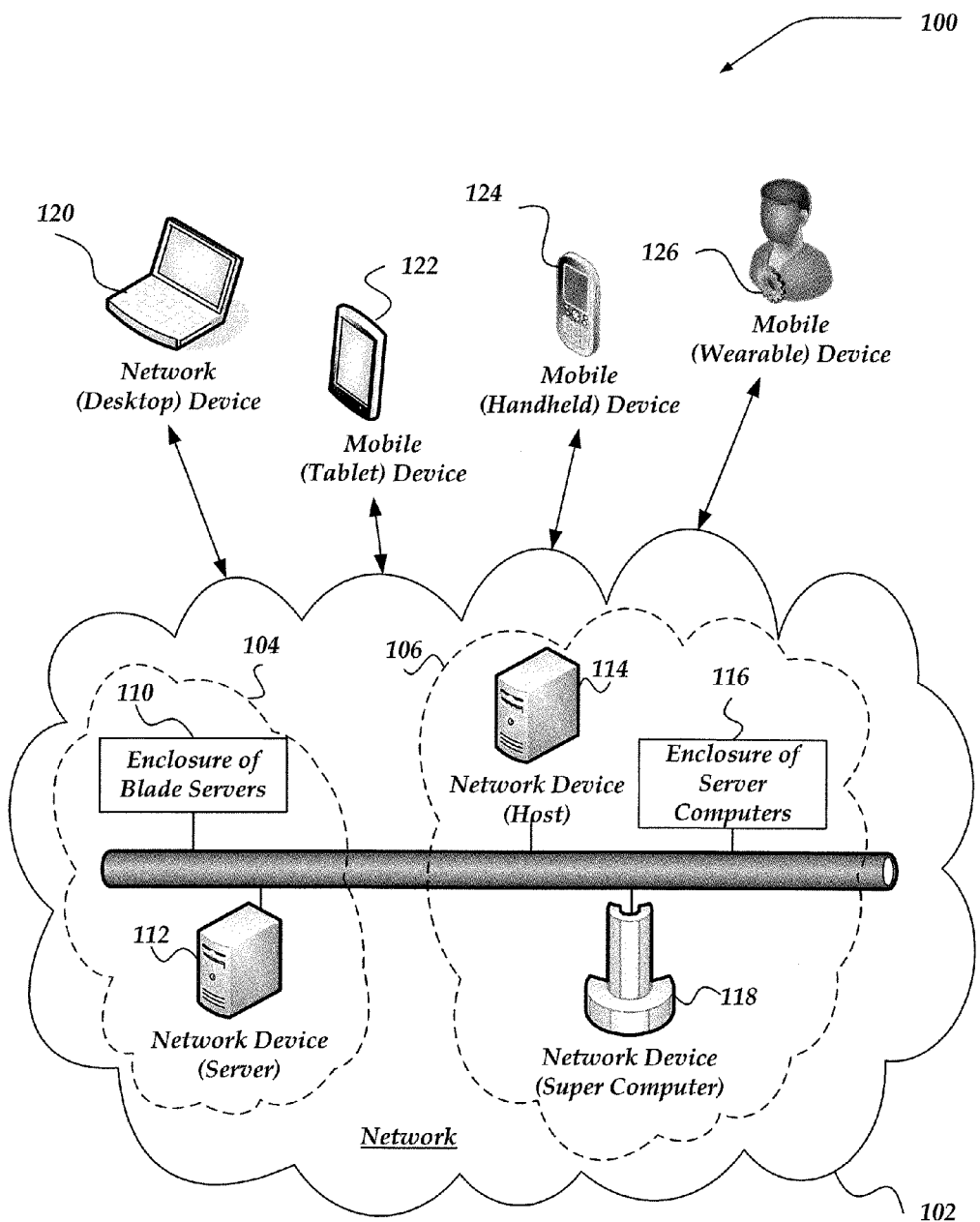
FIG. 1 illustrates a system environment in which various embodiments may be implemented.

The invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

For example embodiments, the following terms are also used herein according to the corresponding meaning, unless the context clearly dictates otherwise.

The terms "snapshot," or "snapshots" as used herein refer to a data structure that maintains a stable image in a well-defined state for one or more files in a file system. Snapshots preserve point-in-time consistent state and/or contents of one or more files. Snapshots may enable the state and/or contents of files to be preserved based on the point-in-time the snapshot was generated. In at least one of the various embodiments, snapshots may be generated on demand or automatically (e.g., event driven and/or timer driven).

In at least one of the various embodiments, if a data block is about to be modified it may be copied from the file to the snapshot to preserve the block. Data blocks in a file that remain unmodified may be absent from the snapshot data structure. Thus, in at least one of the various embodiments, a snapshot may be a sparse copy of the file contents with unmodified data blocks remaining in the file rather in being copied to the snapshot.

The terms "writer," or "writers" as used herein refer to threads, processes, applications, or the like, that may be writing data, or trying to write data, to a file on a file system. Likewise, "reader," or "readers," as used herein refer to threads, processes, applications, or the like, that may be reading, or trying to read data, from a file on a file system. Readers and/or writers may be part of the same process or application, as in the case of threads, or they may be in separate processes or applications. Further, they may be running on the same computing device or on one or more separate computing devices.

The term "inode," as used herein refers to data structures that may store information, or meta-data, about files and folders, such as size, file ownership, access mode (read, write, execute permissions), time and date of creation and modification, file type, or the like. In at least one of the various embodiments, inode data structures may contain one or more references or pointer to the actual data blocks of the contents stored in the file. In at least one of the various embodiments, inodes may be in a known location in a file system. From an inode, a reader or writer may access the contents of the inode and the contents of the file. Some file systems implement inodes using a data structure called an inode. In at least one of the various embodiments, a data structure explicitly named "inode" may be absent, but file systems may have data structures that store data similar to inodes and may provide capabilities similar to inodes as described herein. Also, in at least one of the various embodiments, the inode data may be referred to as stat data, in reference to the stat system call that provides the data to processes.

The term "delta data" as used herein, refers to data elements, fields, or ranges, of a data structure where updates to such data may be recorded in a journaling system rather than being applied directly to actual instance of the data structure.

The term "non-delta data" as used herein, refers to data elements, fields, or ranges, of a data structure where updates to such data may be applied directly to an instance of the data structure rather than recorded as journal deltas.

The term "journal deltas" as used herein, refers to entries or records stored in a journaling system that may record or track changes made to the delta data of a data structure instance.

The term "data block" as used herein refers to file based data structures that may be the basic unit for data contained in a file. One or more data blocks may be associated with an inode or a shadow store using various well-known data structures such as b-trees, linked lists, or the like. In at least one of the various embodiments, data blocks may include meta-data (e.g., one or more pointers) that reference physical blocks on a storage device.

The term "reference block" as used herein refers to a block owned by an inode that serves as an indirect reference to a data block owned by a shadow store. Reference blocks may include a pointer or reference to a data block instead of the data content. Multiple reference blocks (e.g., from separate files) may reference the same shadow store block. In at least one of the various embodiments, reference blocks may be generated from data blocks by changing the meta-data within the block. For example, a data block may include meta-data (e.g., a pointer) that points to a physical block on a storage device. The data block may be converted to a reference block by changing the meta-data pointer to point to logical blocks that may be in a shadow store. The data block may be considered replaced by a reference block if the meta-data in the block is modified to point to a shadow store block.

The term "data region" as used herein refers to one or more data/reference blocks treated as a group. In some embodiments it may be advantageous to group blocks into data regions if transferring and/or processing data. In at least one of the various embodiments, a region may include a mix of data blocks and/or reference blocks. In some cases a data region may be defined based on address ranges within a file. For example, a data region may be defined as blocks 0 through 20 in a file and it may include a combination of data blocks or reference blocks.

The terms "partial data region," or "partial data block" as used herein refer to an amount of data less than the capacity of a data block. For example, in at least one of the various embodiments, if a file system is configured such that data blocks have a capacity of 64 kilobytes, a portion of data that is 24 kilobytes may be considered a partial data block.

The term "protection group" as used herein refers to a collection of data blocks arranged to support error correction and error validation techniques such as forward error correction. Protection groups often may be arranged to include one or more data blocks and one or more error correction blocks. In at least one of the various embodiments, if data blocks are damaged or lost, in some cases, the error correction blocks in a protection group may be used to recover the damaged or lost data.

The term "shadow store" as used herein refers to a file-based data structure that includes one or more data blocks that may be referenced by one or more reference blocks. In at least one of the various embodiments, shadow stores may be indirectly accessed by readers or writers. Data in a shadow store is accessed by way of dereferencing the pointer information that may be in reference blocks.

The term "shadow store block," or "shadow store region" as used herein refer data blocks or data regions that may be associated with a shadow store. Generally, they are the same as data blocks and data regions except rather than associated with file inodes they are associated with shadow stores. This terminology is useful for distinguishing between data blocks owned by inodes and data blocks owned by a shadow store.

Briefly stated, various embodiments are directed towards cloning files in a distributed file system. In response to a request to create one or more file clones, a file cloning application may be employed to generate one or more file clones based on a source file. The file cloning application may generate a new inode for each new file clone and at least one new shadow store. Data blocks from the source file may be transferred to the shadow store. The transferred data blocks may be replaced with reference blocks that point to the data blocks that were transferred to the shadow store. Likewise, additional reference blocks pointing to data blocks in the shadow store may be generated and associated with the new file clone inodes. Further, the shadow store may maintain reference counters that track the number of reference blocks pointing to each shadow store block.

Also, in at least one of the various embodiments, file clones may be generated based on a point-in-time snapshot of the source file. If the source file data blocks have been modified since the taking of the snapshot, data blocks from the snapshot corresponding to the modified data blocks in the source file may be transferred to the shadow store. If a source file data block may be unmodified since the taking of the snapshot, the data block may be transferred directly from the source file to the shadow store.

In at least one of the various embodiments, if the target address of a write operation directed at a file resolves to a reference block, the reference block in the file may be replaced by copying the corresponding shadow store block from the shadow store before completing the write operation. As reference blocks are replaced by data blocks, the corresponding reference counters in the shadow store may be decremented.

In at least one of the various embodiments, if the reference count for a data block is reduced to zero, the corresponding shadow store block may be discarded. In at least one of the various embodiments, a scheduled process may be configure to sweep through the file system and delete discarded shadow store blocks.

In at least one of the various embodiments, if a address of a data read directed at a file resolves to a reference block, the file system may dereference the pointers and/or references included in the reference block to retrieve the requested data from the corresponding shadow store block.

In at least one of the various embodiments, file clones may be generated from source files that include reference blocks pointing to a shadow store from a previous file cloning operation. Thus, in at least one of the various embodiments, the source file may include reference blocks pointing to shadow store block from a shadow store generated during the previous cloning. For preexisting reference blocks found in the source file during cloning, the new clone files may receive corresponding reference blocks that point to the old shadow store. This may result in file clones that include reference blocks pointing to multiple shadow stores.

In at least one of the various embodiments, one or more local in-memory read caches may be generated at a file inode to reduce latency for subsequent reads of the same data. Each inode for each file clone may have its own local in-memory read cache. Accordingly, some data regions may be cached multiple times. Also, in-memory read caches may be generated local the shadow-store. In at least one of the various embodiments, in-memory caches may be generated on the computing device nodes that may comprise a distributed file system.

Furthermore, in at least one of the various embodiments, a file cloning application may determine that partial data blocks may be copied directly to the file clones rather than transferring to the shadow store and generating reference blocks in the file clones.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computing device. As shown, the networked computing devices may include server network device 112, host network device 114, enclosure of blade servers 110, enclosure of server computers 116, super computer network device 118, and the like. Although not shown, one or more mobile devices may be included in cloud network 102 in one or more arrangements to provide one or more network services to a user. Also, these arrangements of networked computing devices may or may not be mutually exclusive of each other.

Additionally, the user may employ a plurality of virtually any type of wired or wireless networked computing devices to communicate with cloud network 102 and access at least one of the network services enabled by one or more of arrangements 104 and 106. These networked computing devices may include tablet mobile device 122, handheld mobile device 124, wearable mobile device 126, desktop network device 120, and the like. Although not shown, in various embodiments, the user may also employ notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding devices, and the like.

One embodiment of a mobile device is described in more detail below in conjunction with FIG. 3. Generally, mobile devices may include virtually any substantially portable networked computing device capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs) Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computing devices could be remotely connected to networks via a modem and a temporary communication link. In essence, network 102 may include virtually any communication technology by which information may travel between computing devices. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network devices such as terminals, gateways, routers, switches, firewalls, load balancers, and the like, which are coupled to wired and/or wireless communication links. These autonomous devices may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), $5^{th}$ (5G) generation wireless access technologies, and the like, for mobile devices. These wired and wireless access technologies may also include Global System for Mobile communication (GSM), General Packet Radio. Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide Interoperability for Microwave Access (WiMax), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile device to wirelessly access a network service through a combination of several radio network access technologies such as GSM, EDGE, SMS, HSDPA, LTE and the like.

Enclosure of Blade Servers

Figure 2A:
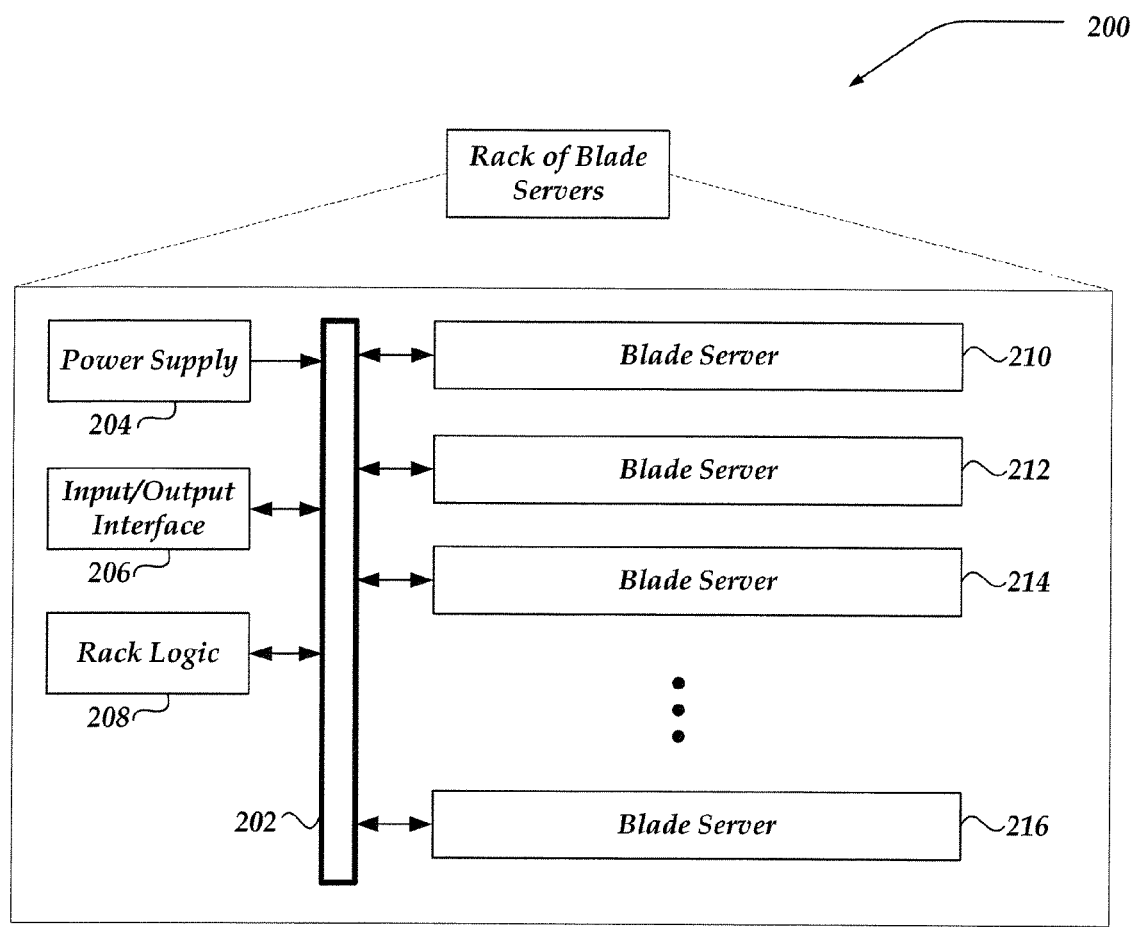
FIG. 2A shows a schematic drawing of a rack of blade servers.

FIG. 2A shows one embodiment of an enclosure of blade servers 200, which are also illustrated in FIG. 1. Enclosure of blade servers 200 may include many more or fewer components than those shown in FIG. 2A. However, the components shown are sufficient to disclose an illustrative embodiment. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that merely require a network connection and a power cord connection to operate. Each server computer often includes redundant components for power and interfaces.

As shown in the figure, enclosure 200 contains power supply 204, and input/output interface 206, rack logic 208, several blade servers 210, 212, 214, and 216, and backplane 202. Power supply 204 provides power to each component and blade server within the enclosure. The input/output interface 206 provides internal and external communication for components and blade servers within the enclosure. Backplane 208 can enable passive and active communication of power, logic, input signals, and output signals for each blade server.

Illustrative Blade Server

Figure 2B:
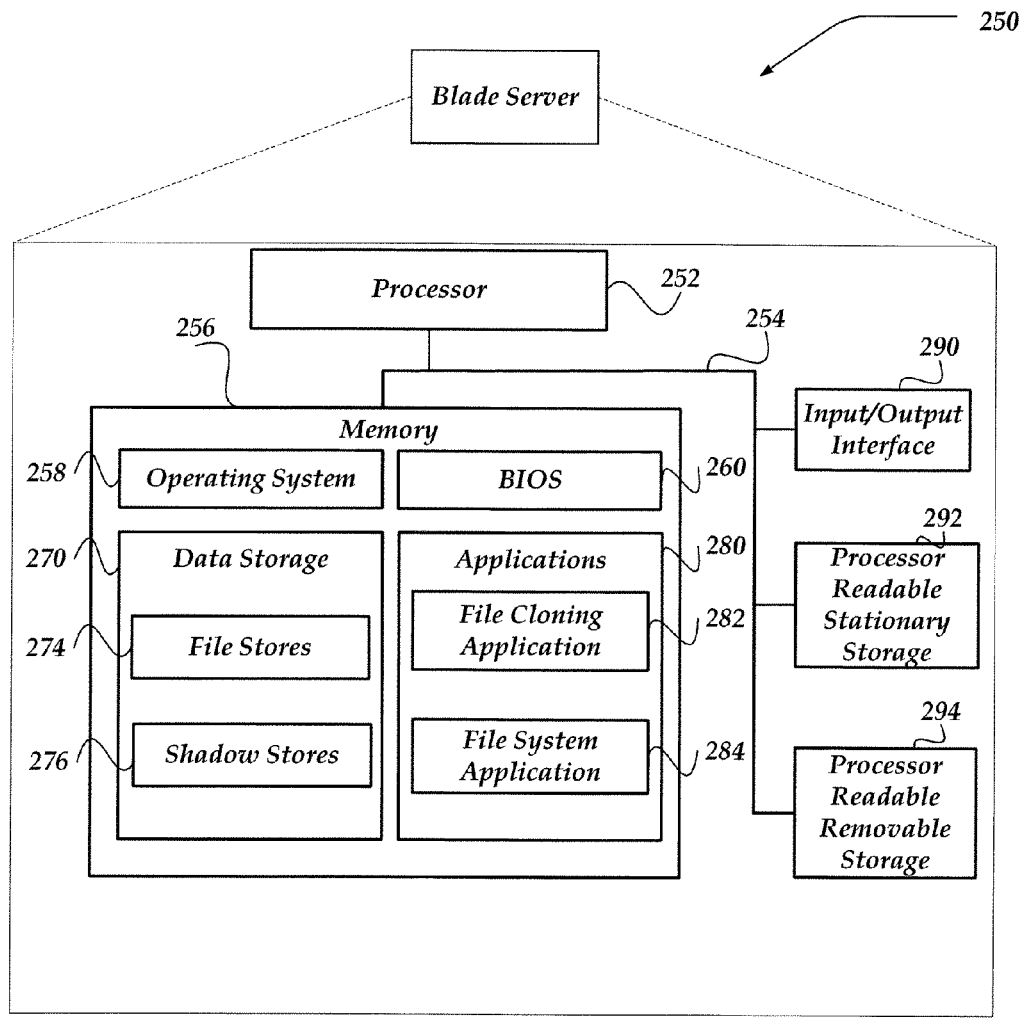
FIG. 2B illustrates a schematic embodiment of a blade server that may be included in a rack of blade servers such as that shown in FIG. 2A.

FIG. 2B illustrates an illustrative embodiment of blade server 250, which may include many more or fewer components than those shown. As shown in FIG. 2A, a plurality of blade servers may be included in one enclosure that shares resources provided by the enclosure to reduce size, power, and cost.

Blade server 250 includes processor 252 which communicates with memory 256 via bus 254. Blade server 250 also includes input/output interface 290, processor-readable stationary storage device 292, and processor-readable removable storage device 294. Input/output interface 290 can enable blade server 250 to communicate with other blade servers, mobile devices, network devices, and the like. Interface 190 may provide wireless and/or wired communication links for blade server. Processor-readable stationary storage device 292 may include devices such as an electromagnetic storage device (hard disk), solid state hard disk (SSD), hybrid of both an SSD and a hard disk, and the like. Also, processor-readable removable storage device 294 enables processor 252 to read non-transitive storage media for storing and accessing processor-readable instructions, modules, data structures, and other forms of data. The non-transitive storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server 250. In various embodiments, a general-purpose operating system may be employed such as a version of UNIX, or LINUX™, or a specialized server operating system such as Microsoft's Windows Server™ and Apple Computer's IoS Server™.

Memory 256 further includes one or more data storage 270, which can be utilized by blade server 250 to store, among other things, applications 280 and/or other data. Data stores 270 may include program code, data, algorithms, and the like, for use by processor 252 to execute and perform actions. In one embodiment, at least some of data store 270 might also be stored on another component of blade server 250, including, but not limited to, processor-readable removable storage device 294, processor-readable stationary storage device 292, or any other processor-readable storage device (not shown). Data storage 270 may include, for example, file stores 274, and shadow stores 276.

Applications 280 may include processor executable instructions which, when executed by blade server 250, transmit, receive, and/or otherwise process messages, audio, video, and enable communication with other networked computing devices. Examples of application programs include database servers, file servers, calendars, transcoders, and so forth. Applications 280 may include, for example, file cloning application 282, and file system application 284.

Human interface components (not pictured), may be remotely associated with blade server 250, which can enable remote input to and/or output from blade server 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Illustrative Mobile Device

Figure 3:
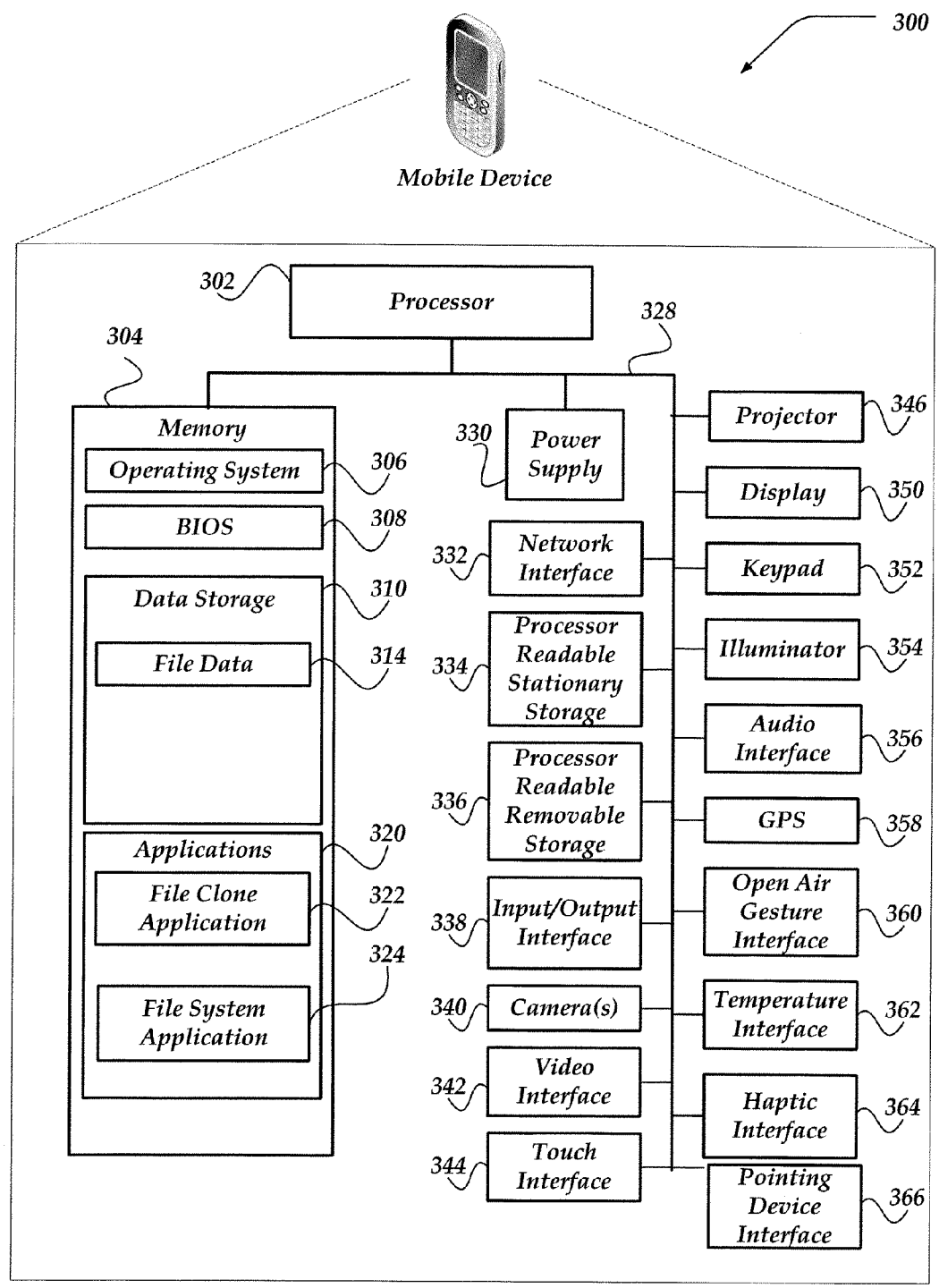
FIG. 3 shows a schematic embodiment of a mobile device.

FIG. 3 shows one embodiment of mobile device 300 that may include many more or less components than those shown. Mobile device 300 may represent, for example, at least one embodiment of mobile devices shown in FIG. 1.

Mobile device 300 includes processor 302 in communication with memory 304 via bus 328. Mobile device 300 also includes power supply 330, network interface 332, audio interface 356, display 350, keypad 352, illuminator 354, video interface 342, input/output interface 338, haptic interface 364, global positioning systems (GPS) receiver 358, Open air gesture interface 360, temperature interface 362, camera(s) 340, projector 346, pointing device interface 366, processor-readable stationary storage device 334, and processor-readable removable storage device 336. Power supply 330 provides power to mobile device 300. A rechargeable or non-rechargeable battery may be used to provide power. The power may also be provided by an external power source, such as an AC adapter or a powered docking cradle that supplements and/or recharges the battery. And in one embodiment, although not shown, a gyroscope may be employed within mobile device 300 to measuring and/or maintaining an orientation of mobile device 300.

Mobile device 300 may optionally communicate with a base station (not shown), or directly with another computing device. Network interface 332 includes circuitry for coupling mobile device 300 to one or more networks, and is constructed for use with one or more communication protocols and technologies including, but not limited to, protocols and technologies that implement any portion of the Open Systems Interconnection (OSI) model for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), Web Access Protocol (WAP), ultra wide band (UWB), IEEE 802.16 Worldwide Interoperability for Microwave Access (WiMax), Session Initiation Protocol/Real-time Transport Protocol (SIP/RTP), General Packet Radio Services (GPRS), Enhanced Data GSM Environment (EDGE), Wideband Code Division Multiple Access (WCDMA), Long Term Evolution Advanced (LTE), Universal Mobile Telecommunications System (UMTS), Orthogonal frequency-division multiplexing (OFDM), Code Division Multiple Access 2000 (CDMA2000), Evolution-Data Optimized (EV-DO), High-Speed Downlink Packet Access (HSDPA), or any of a variety of other wireless communication protocols. Network interface 332 is sometimes known as a transceiver, transceiving device, or network interface card (NIC).

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of mobile device 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computing device. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures. Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images. Illuminator 354 may provide a status indication and/or provide light. Illuminator 354 may remain active for specific periods of time or in response to events. For example, when illuminator 354 is active, it may backlight the buttons on keypad 352 and stay on while the mobile device is powered. Also, illuminator 354 may backlight these buttons in various patterns when particular actions are performed, such as dialing another mobile device. Illuminator 354 may also cause light sources positioned within a transparent or translucent case of the mobile device to illuminate in response to actions.

Mobile device 300 also comprises input/output interface 338 for communicating with external peripheral devices or other computing devices such as other mobile devices and network devices. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like. Haptic interface 364 is arranged to provide tactile feedback to a user of the mobile device. For example, the haptic interface 364 may be employed to vibrate mobile device 300 in a particular way when another user of a computing device is calling. Temperature interface 362 may be used to provide a temperature measurement input and/or a temperature changing output to a user of mobile device 300. Open air gesture interface 360 may sense physical gestures of a user of mobile device 300, for example, by using single or stereo video cameras, radar, a gyroscopic sensor inside a device held or worn by the user, or the like. Camera 340 may be used to track physical eye movements of a user of mobile device 300.

GPS transceiver 358 can determine the physical coordinates of mobile device 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile device 300 on the surface of the Earth. It is understood that under different conditions, GPS transceiver 358 can determine a physical location for mobile device 300. In at least one embodiment, however, mobile device 300 may, through other components, provide other information that may be employed to determine a physical location of the device, including for example, a Media Access Control (MAC) address, IP address, and the like.

Human interface components can be peripheral devices that are physically separate from mobile device 300, allowing for remote input and/or output to mobile device 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile device with such peripheral human interface components is a wearable computing device, which might include a remote pico projector along with one or more cameras that remotely communicate with a separately located mobile device to sense a user's gestures toward portions of an image projected by the pico projector onto a reflected surface such as a wall or the user's hand.

A mobile device may include a browser application that is configured to receive and to send web pages, web-based messages, graphics, text, multimedia, and the like. The mobile device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of mobile device 300. The memory also stores an operating system 306 for controlling the operation of mobile device 300. It will be appreciated that this component may include a general-purpose operating system such as a version of UNIX, or LINUX™, or a specialized mobile computer communication operating system such as Windows Mobile™, or the Symbian® operating system. The operating system may include, or interface with a Java virtual machine module that enables control of hardware components and/or operating system operations via Java application programs.

Memory 304 further includes one or more data storage 310, which can be utilized by mobile device 300 to store, among other things, applications 320 and/or other data. For example, data storage 310 may also be employed to store information that describes various capabilities of mobile device 300. The information may then be provided to another device based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of mobile device 300, including, but not limited to, non-transitory processor-readable removable storage device 336, processor-readable stationary storage device 334, or even external to the mobile device. Data storage 310 may include, for example, file data 314.

Applications 320 may include computer executable instructions which, when executed by mobile device 300, transmit, receive, and/or otherwise process instructions and data. Applications 320 may include, for example, file clone application 322, and file system application 324. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Illustrative Network Device

Figure 4:
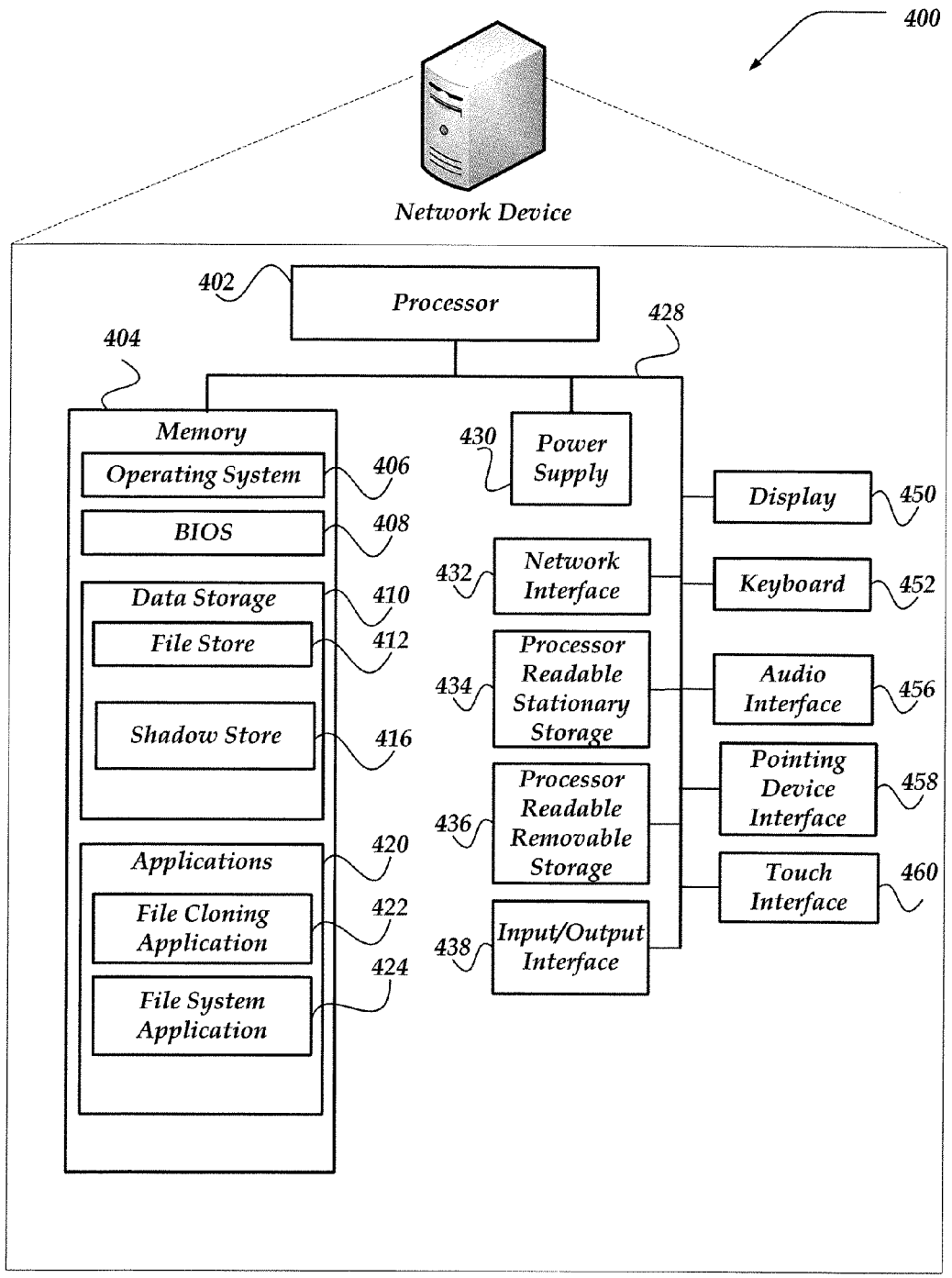
FIG. 4 illustrates a schematic embodiment of a network device.

FIG. 4 shows one embodiment of network device 400 that may be included in a system implementing the invention. Network device 400 may include many more or less components than those shown in FIG. 4. However, the components shown are sufficient to disclose an illustrative embodiment for practicing the present invention. Network device 400 may represent, for example, one embodiment of at least one of network device 112, 114, or 120 of FIG. 1.

As shown in the figure, network device 400 includes a processor 402 in communication with a memory 404 via a bus 428. Network device 400 also includes a power supply 430, network interface 432, audio interface 456, display 450, keyboard 452, input/output interface 438, processor-readable stationary storage device 434, and processor-readable removable storage device 436. Power supply 430 provides power to network device 400.

Network interface 432 includes circuitry for coupling network device 400 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 432 is sometimes known as a transceiver, transceiving device, or network interface card (NIC). Network device 400 may optionally communicate with a base station (not shown), or directly with another computing device.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network device 400, for example, using voice recognition.

Display 450 may be a liquid crystal display (LCD), gas plasma, electronic ink, light emitting diode (LED), Organic LED (OLED) or any other type of light reflective or light transmissive display that can be used with a computing device. Display 450 may be a handheld projector or pico projector capable of projecting an image on a wall or other object.

Network device 400 also may also comprise input/output interface 438 for communicating with external devices not shown in FIG. 4. Input/output interface 438 can utilize one or more wired or wireless communication technologies, such as USB™, Firewire™, WiFi, WiMax, Thunderbolt™, Infrared, Bluetooth™, Zigbee™, serial port, parallel port, and the like.

Human interface components can be physically separate from network device 400, allowing for remote input and/or output to network device 400. For example, information routed as described here through human interface components such as display 450 or keyboard 452 can instead be routed through the network interface 432 to appropriate human interface components located elsewhere on the network. Human interface components include any component that allows the computer to take input from, or send output to, a human user of a computer.

Memory 404 may include Random Access Memory (RAM), Read-Only Memory (ROM), and/or other types of memory. Memory 404 illustrates an example of computer-readable storage media (devices) for storage of information such as computer-readable instructions, data structures, program modules or other data. Memory 404 stores a basic input/output system (BIOS) 408 for controlling low-level operation of network device 400. The memory also stores an operating system 406 for controlling the operation of network device 400. It will be appreciated that this component may include a general-purpose operating system such as a version of UNIX, or LINUX™, or a specialized operating system such as Microsoft Corporation's Windows® operating system, or the Apple Corporation's IOs® operating system. The operating system may include, or interface with a Java virtual machine module that enables control of hardware components and/or operating system operations via Java application programs.

Memory 404 further includes one or more data storage 410, which can be utilized by network device 400 to store, among other things, applications 420 and/or other data. For example, data storage 410 may also be employed to store information that describes various capabilities of network device 400. The information may then be provided to another device based on any of a variety of events, including being sent as part of a header during a communication, sent upon request, or the like. Data storage 410 may also be employed to store social networking information including address books, buddy lists, aliases, user profile information, or the like. Data stores 410 may further include program code, data, algorithms, and the like, for use by a processor, such as processor 402 to execute and perform actions. In one embodiment, at least some of data store 410 might also be stored on another component of network device 400, including, but not limited to, non-transitory media inside processor-readable removable storage device 436, processor-readable stationary storage device 434, or any other computer-readable storage device within network device 400, or even external to network device 400. Data storage 410 may include, for example, file store 412, and shadow store 416.

Applications 420 may include computer executable instructions which, when executed by network device 400, transmit, receive, and/or otherwise process messages (e.g., SMS, Multimedia Messaging Service (MMS), Instant Message (IM), email, and/or other messages), audio, video, and enable telecommunication with another user of another mobile device. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 420 may include, for example, file cloning application 422, and file system application 424.

Generalized File Cloning Operation

FIGS. 5A-5D illustrate logical schematics showing portions of file cloning procedure 500 in accordance with at least one of the various embodiments.

In at least one of the various embodiments, a file system may include multiple files comprising inodes and data blocks. Each inodes may be associated with a file and may include meta-data such as, block count, last-access-time, file size, permissions, file name, pointers to the file data blocks, or the like.

In at least one of the various embodiments, inodes may reference thousands or millions of the data blocks. Data blocks may be associated with an inode using a variety of well-know data structures, including B-trees, linked lists, or the like.

In at least one of the various embodiments, in distributed file systems files and/or inodes may be distributed across one or more physical computing devices (nodes) arranged in the cluster. Also, nodes may include virtual machine nodes that may be running under the supervision of a hypervisor.

In at least one of the various embodiments, data blocks owned by an inode may be distributed among one or more nodes in the distributed file system. In at least one of the various embodiments, data blocks may be grouped in protection groups that include data blocks and error correction blocks. While not depicted in the figures, data blocks, reference blocks, inodes, shadow stores, shadow store blocks, or the like, may be distributed among nodes in a distributed file system.

Figure 5A:
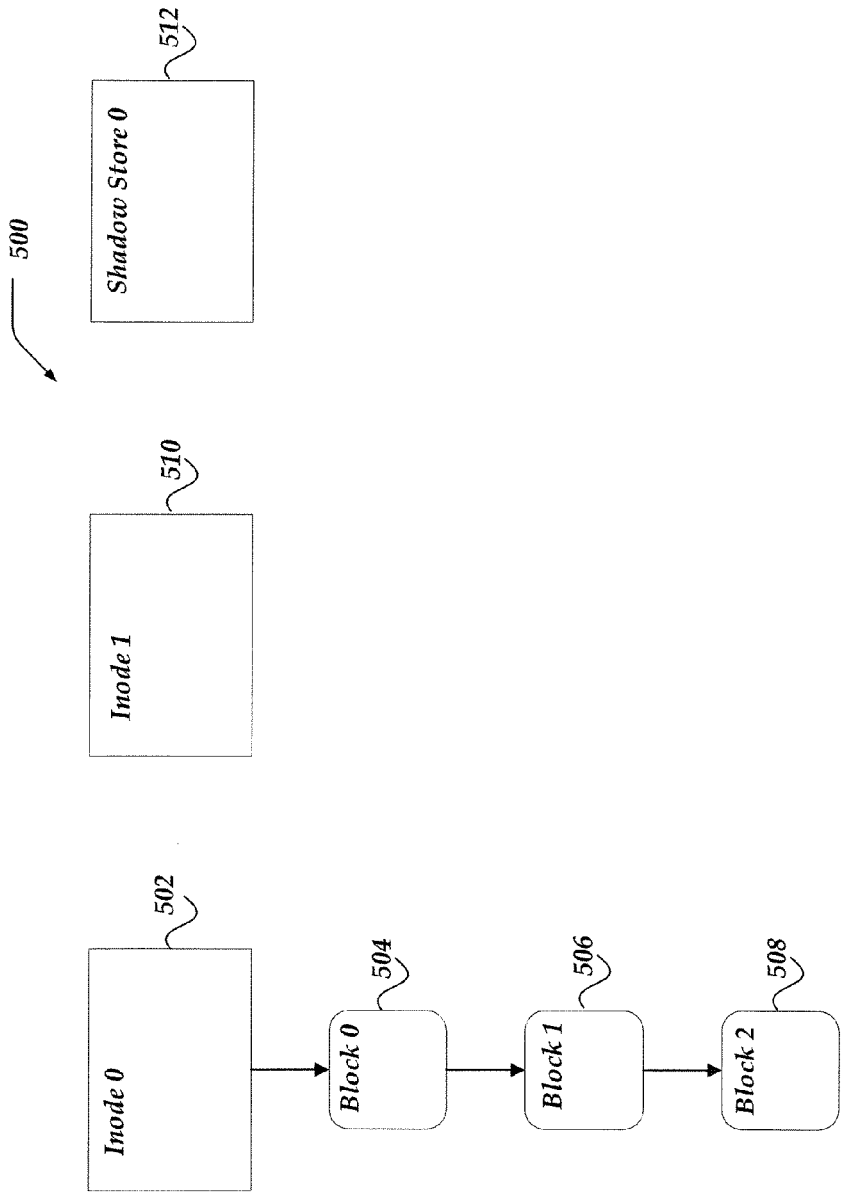
FIGS. 5A-5D illustrate logical schematics showing portions of a file cloning procedure in accordance with at least one of the various embodiments.

FIG. 5A represents the logical schematic of the first stage(s) for file cloning procedure 500. In at least one of the various embodiments, inode 502 may include references to data blocks 504-508. These blocks may represent the data comprising the file. In at least one of the various embodiments, the data included in the data blocks may be text and/or binary data, or a combination thereof. In at least one of the various embodiments, inode 502 and data blocks 504-508 may be stored on different/separate nodes in a distributed file system. In at least one of the various embodiments, the data structures comprising the inode and data blocks may be file based rather than device block based.

In at least one of the various embodiments, users/processes that access the data in a file corresponding to inode 502 may use file system calls that locate and/or retrieve inode 502. Further, the data structures in the inode may enable the data blocks to be located. Also, inode 502 may enable additional blocks to be associated with the file as needed (e.g., for writes and/or create operations).

In at least one of the various embodiments, if a user or process initiates a file clone operation, another inode such as inode 510 may be generated. In at least one of the various embodiments, even though inode 510 represents a separate file some of the meta-data values of inode 510 may be the same as inode 502, such as, file size, block count, access dates, permissions, or the like. In at least one of the various embodiments, the inode associated with a file clone may be generated with different permissions and access levels than the source inode.

Additionally, in at least one of the various embodiments, shadow store 512 also may be generated. In at least one of the various embodiments, shadow store 512 may be similar to an inode except that for most users and/or processes the shadow store inode is invisible and/or inaccessible. In at least one of the various embodiments, inode 502, inode 510, or shadow store 512 may be generated on separate file system nodes. If the target inode and the shadow store are initialized, the generation of the file clone of inode 502 may continue. Also, in at least one of the various embodiments, file cloning application may employ an existing shadow store as part of the file cloning procedure.

Figure 5B:
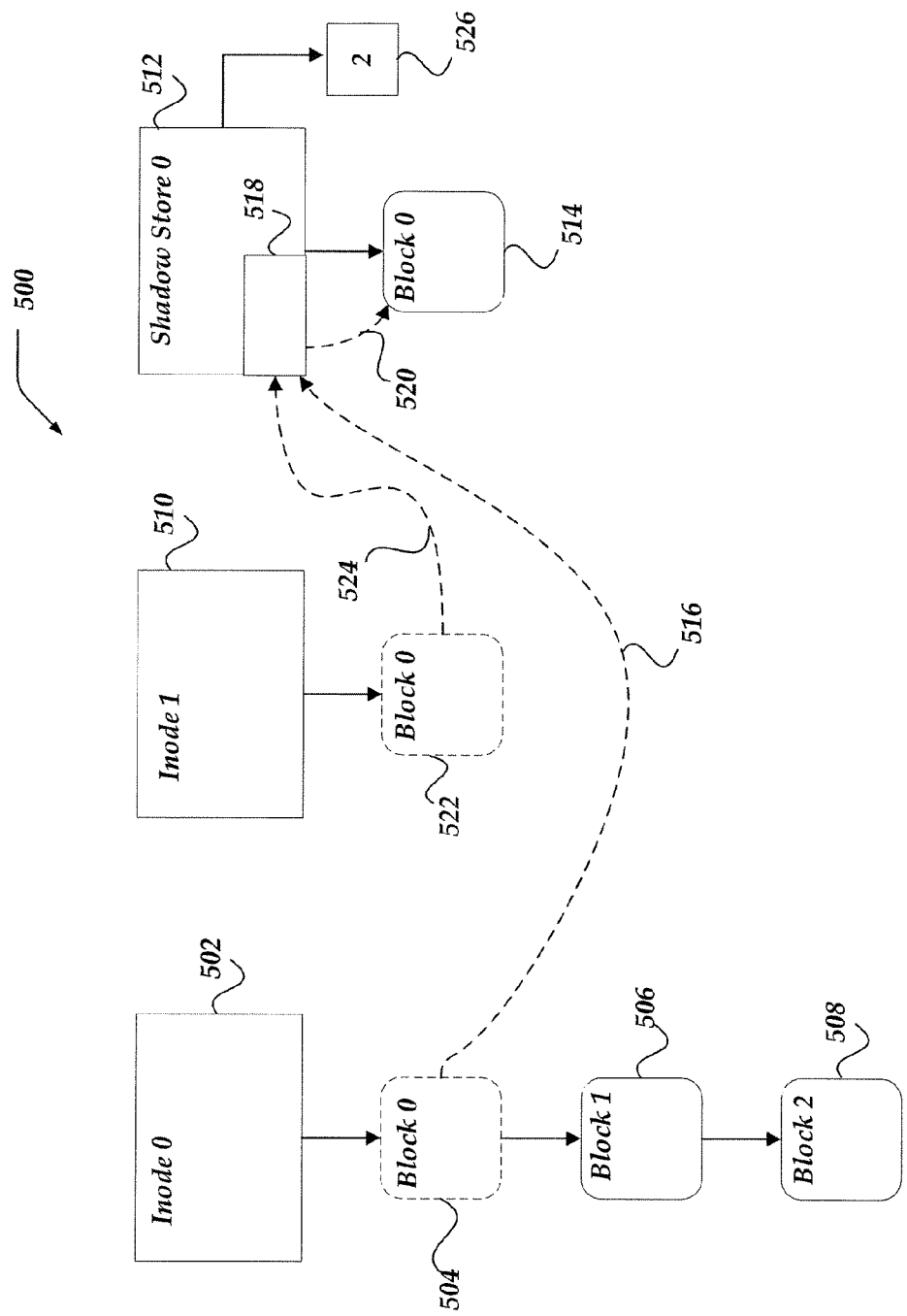

FIG. 5B represents the logical schematic of a portion of the early stage(s) for file cloning procedure 500. In at least one of the various embodiments, file cloning application 422 may continue generating a file clone of inode 502 by transferring data blocks owned by inode 502 to shadow store 512.

In at least one of the various embodiments, file cloning application 422 may determine a data region owned by inode 502 to transfer to the shadow store. In at least one of the various embodiments, a data region may be one or more blocks and/or portions of blocks. For ease of description, the embodiment depicted in FIG. 5B determines each data region to be a single block. One of ordinary skill in the art will appreciate that using a data region that includes a single data block is non-limiting. In at least one of the various embodiments, a data region may be determined to include multiple data blocks.

As shown in FIG. 5B, in at least one of the various embodiments, the data included block 504 is selected for transfer to shadow store 512. In at least one of the various embodiments, this may result in the generation of shadow store block 514. Further, in at least one of the various embodiments, block 504 may be changed from a data block to a reference block that reference's shadow store block 514. Pointer 516, illustrates that block 504 references data stored in shadow store 512 at block 514.

In at least one of the various embodiments, pointer 516 points into index 518. In at least one of the various embodiments, index 518 may further indentify the specific shadow store block that includes the data that used to be in block 504. Pointer 520 illustrates the indirection between the reference block 504 and shadow store block 514.

In at least one of the various embodiments, index 518 abstracts the data structures and/or indexing employed in the shadow store. In at least one of the various embodiments, the file cloning application may employ index 518 and pointers 520 to enable a shadow store to arrange and/or layout its shadow store blocks independently from the order that block may have been arranged in the source the file. Thus, the layout/order of shadow store blocks may be arranged independently of their order in the inodes. The figures and description herein show the data blocks, reference blocks and shadow store blocks in the same corresponding order/position for brevity and convenience to aid in clarifying the description.

In at least one of the various embodiments, a shadow store may include shadow store blocks referenced by file unrelated to the current file cloning operation. Further, in at least one of the various embodiments, index 518 enables the file cloning application to arrange and/or optimize the shadow store blocks independent from the reference blocks that may be pointing to the shadow store. In at least one of the various embodiments, index 518 and pointers 520 may be implemented using well-know data structures such as, lookup tables, b-trees, hash tables, or the like.

In at least one of the various embodiments, if the first determined data region from inode 502 has been transferred to the shadow store, the file cloning application may generate reference block 522 and associate it with inode 510. In at least one of the various embodiments, reference block 522 contains a reference to shadow store block 514. Pointer 524 illustrates that reference block 522 points to index 518 in shadow store 512. In at least one of the various embodiments, because inode 510 is a clone of inode 502, it may reference the same shadow store block (e.g., block 514) as reference block 504.

In at least one of the various embodiments, shadow store 512 may track the number of references to a shadow store block using reference counter 526. In this example, since reference block 504 and reference block 522 point to shadow store block 514, the reference counter corresponding to shadow store block 514 has a value of two. In at least one of the various embodiments, reference counter 526 may increase as the number reference blocks pointing to shadow store block 514 increases. Likewise, in at least one of the various embodiments, the value of reference counter 526 may decrease as the number of reference blocks pointing to shadow store block 514 decrease.

Figure 5C:
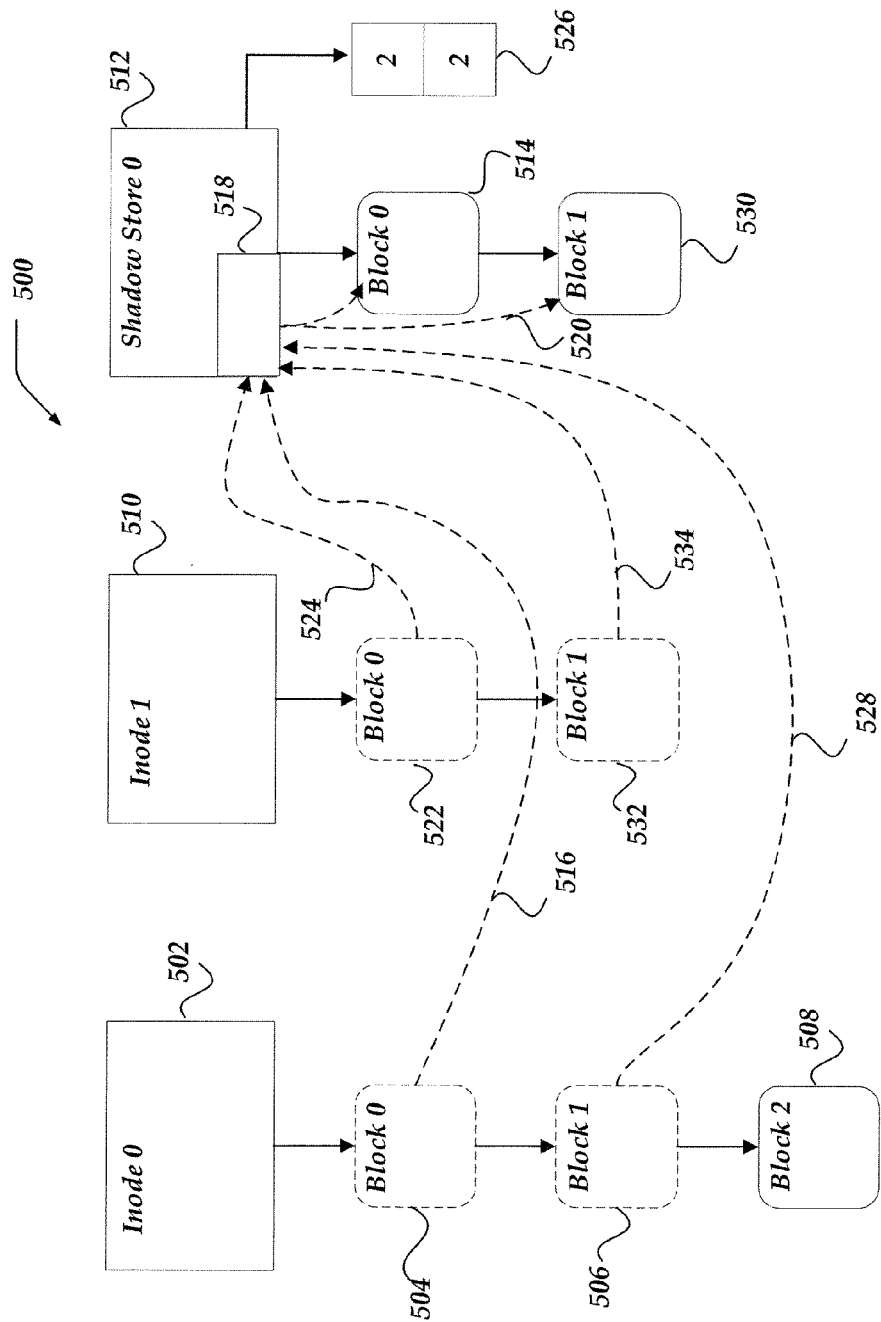

FIG. 5C represents the logical schematic of a portion of further stage(s) for file cloning procedure 500 in accordance with at least one of the embodiments. In at least one of the various embodiments, file cloning application 422 may continue generating a file clone for inode 502 by transferring data blocks owned by inode 502 to shadow store 512.

The schematic in FIG. 5C is similar to FIG. 5B, except it depicts the next data region owned by inode 502 being transferred to shadow store 512. As such, the data from block 506 may be transferred to shadow store block 530 in shadow store 512. Pointer 528 may point from reference block 506 to index 518. Further, in at least one of the various embodiments, pointers 520 may be updated to include pointing to reference block 530.

Also, in at least one of the various embodiments, new reference block 532 may be generated and associated with inode 510. Reference block 532 may point to shadow store block 530 through pointer 534 and pointers 520.

Furthermore, reference counter 526 may be updated to store the reference count for shadow store block 530. In at least one of the various embodiments, because two reference blocks (e.g., reference block 506 and reference block 532) may be pointing to shadow store block 530, the reference count for both shadow store blocks is two.

Figure 5D:
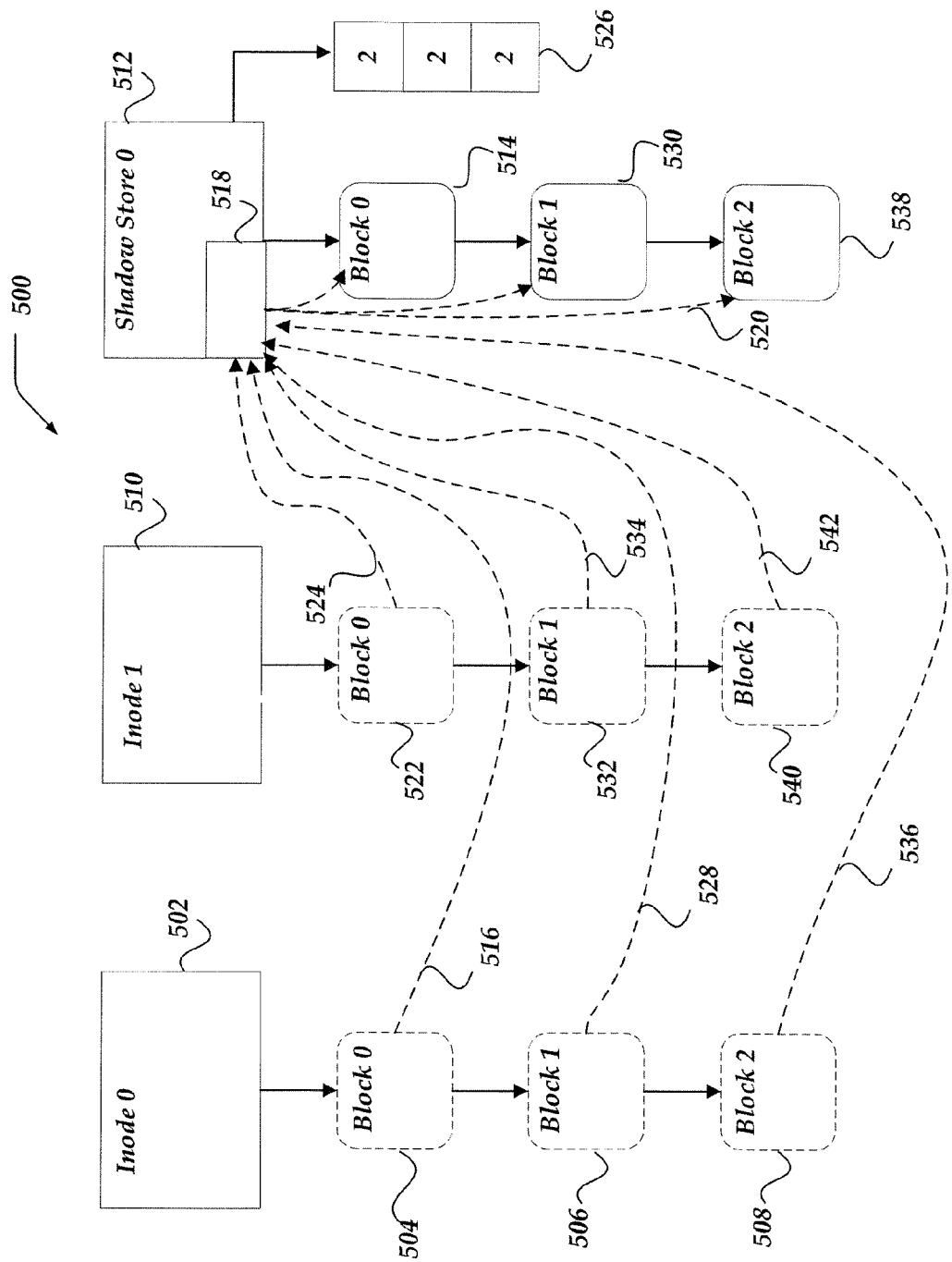

FIG. 5D represents the logical schematic of a portion of the further stage(s) for file cloning procedure 500. In FIG. 5D, in at least one of the various embodiments, the cloning process has progressed following the same pattern as in FIGS. 5B and 5C. The data from block 508 may be transferred to shadow store block 538. Likewise, for inode 510 reference block 540 may be generated. In at least one of the various embodiments, pointers 536 and 542 may reference index 518 of shadow store 512.

Further, in at least one of the various embodiments, reference counter 526 may be updated to include the reference count for block 538. In this example, because block 508 and block 540 indirectly reference block 538, the corresponding reference count value for shadow store block 538 may be two.

In at least one of the various embodiments, reference counting may be implemented using well-known data structures, such as, arrays, linked lists, or the like. Further, in at least one of the various embodiments, reference counters may be included as part of the shadow store blocks such as block 514.

In at least one of the various embodiments, reference counter 526 may be implemented in a data structure separate from the shadow store blocks. Separating the reference counter data structure from the shadow store block data-structures may enable the fields/data in the reference counter to be accessed separate from the data blocks.

In at least one of the various embodiments, improved performance may be obtained by disentangling the locking of the reference counters with the locking of data blocks. For example, as references to shadow store block are added and removed the corresponding reference counters may be updated without locking the shadow store data blocks.

Further, in at least one of the various embodiments, reference counters, such as, reference counter 525, may be arranged to use delta data enabling delta write locks and delta read locks to be acquired on the reference counter data. (See, FIG. 11 and discussion about delta locks below.)

In at least one of the various embodiments, data blocks owned by inodes may be reference using an address scheme such as, "block 0: disk0, offset 1000; block 1: disk0, offset 2000; block 1: disk1, offset 3000." In at least one of the various embodiments, the data block addresses may be stored in well-known data structures such as, lookup tables, arrays, b-trees, or the like.

In at least one of the various embodiments, reference blocks may use a address scheme such as, "block 0: shadow store 0, offset 1000; block 1: shadow store 0, offset 2000, block 2: shadow store 0, offset 3000." In at least one of the various embodiments, the reference block addresses may resolve to an index data structure in the shadow store. The index in the shadow store may include information to maps the reference block address to the corresponding shadow store block.

In at least one of the various embodiments, at the completion of a file cloning operation users may consider the source file and target file as two separate files. In at least one of the various embodiments, the sharing of the shadow store blocks may be hidden from the view of users (and user-space processes).

Cloning Previously Cloned Files

Figure 6A:
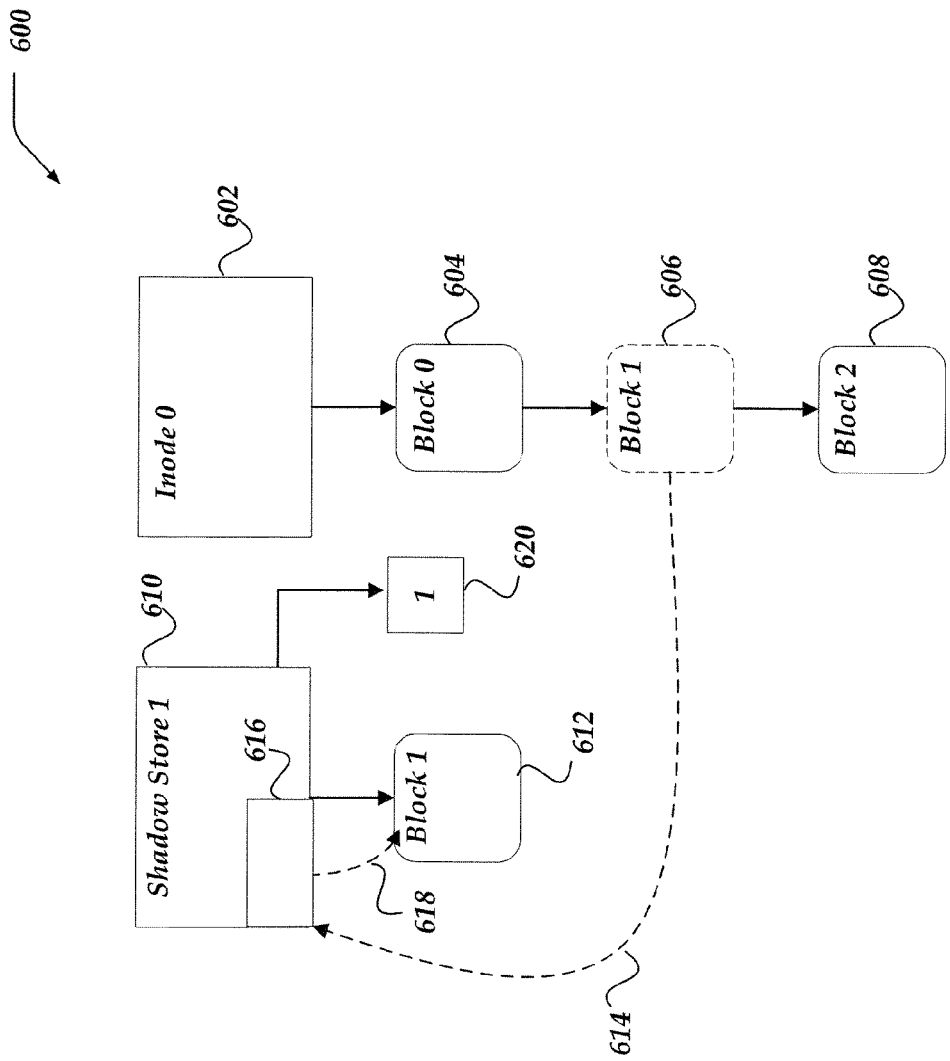
FIGS. 6A-6B illustrate logical schematics showing portions of a file cloning procedure if a source file references a prior shadow store in accordance with at least one of the various embodiments.

In at least one of the various embodiments, file cloning application 422 may be employed to generate a file clone from a source file that is a product/participant of a file cloning operation. In this case, the source file inode may own/include one or more reference blocks that point to another shadow store. FIG. 6A illustrates, for at least one of the various embodiments, a logical schematic of a source file that includes at least one block referencing another shadow store.

In at least one of the various embodiments, this initial state may be similar to the schematic illustrated in FIG. 5A. Inode 602 may represent the file that may be cloned. Inode 602 includes three blocks, data block 604, reference block 606, and data block 608. However, in this embodiment, inode 602 may have been cloned previously (e.g., generally following the procedure described in conjunction with FIGS. 5A-5D). Thus, in at least one of the various embodiments, all or some of the blocks included/owned by inode 602 may be reference blocks that reference one or more blocks in a shadow store that may be correspond to a previous file cloning operation.

In the example depicted in FIG. 6A, for at least one of the embodiments, block 606 is a reference block that points to shadow store 610. Pointer 614 indicates that reference block 606 may be referencing index 616. In at least one of the various embodiments, index 616 maintains the reference to shadow store block 612 shown by pointer 618.

Further, in at least one of the various embodiments, similar to shadow store 512, reference counter 620 tracks the number of reference blocks pointed to shadow store blocks in shadow store 610. Here, in this example, reference count 620 may have a value of one corresponding to reference block 606.

In at least one of the various embodiments, cloning the file represented by inode 602 generally includes executing steps similar to those described in conjunction with FIGS. 5A-5D. However, as illustrated in FIG. 6B there may be differences.

Figure 6B:
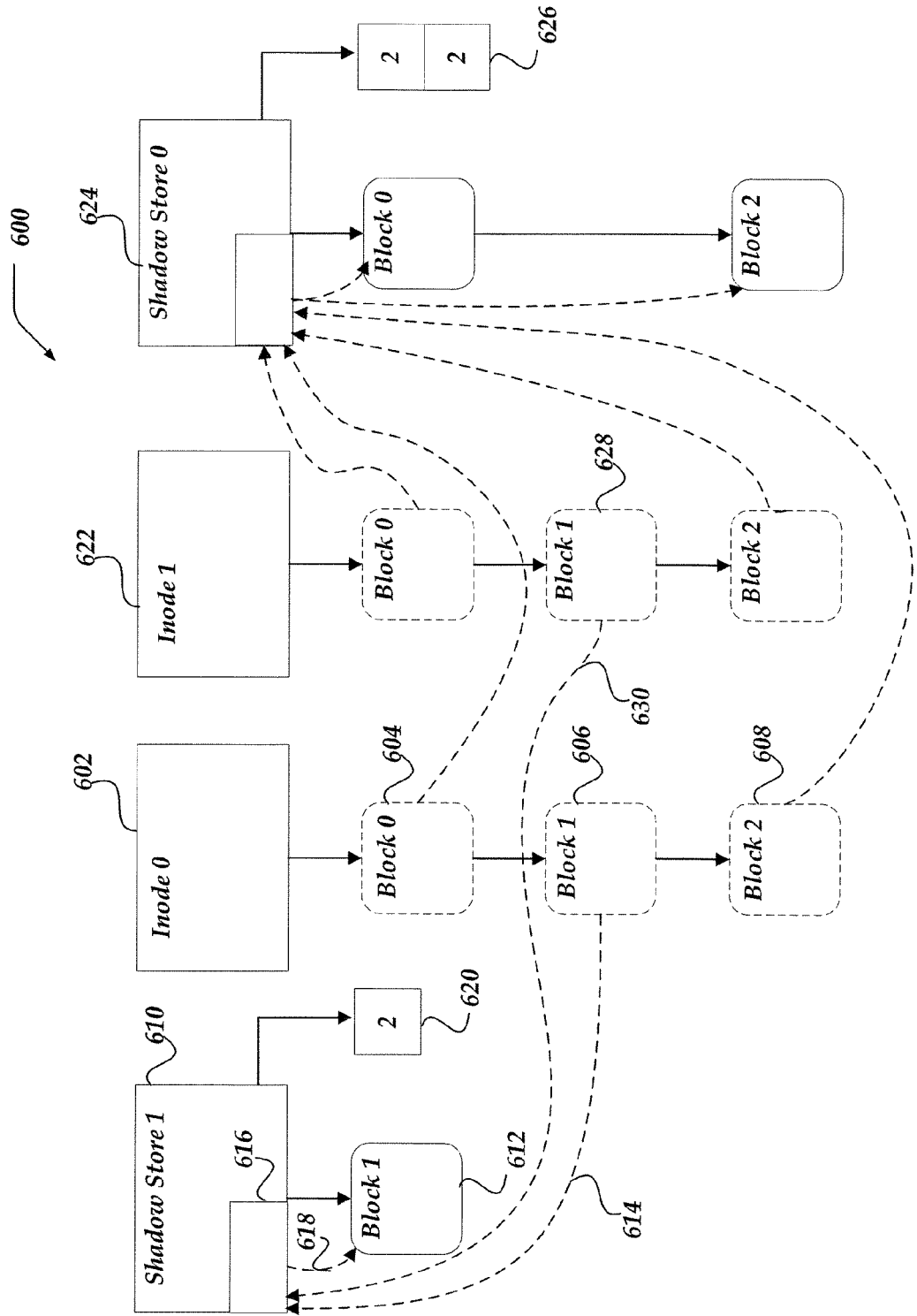

FIG. 6B shows for, at least one of the various embodiments, logical schematic 600 at the completion of a file clone operation. In this example, in at least one of the various embodiments, inode 602 may have been cloned to generate inode 622. And, shadow store 624 may have been generated in conjunction with the file cloning operation.

In at least one of the various embodiments, at the completion of cloning inode 622 from inode 602, two shadow stores may remain (e.g., shadow store 602 and shadow store 622).

In at least one of the various embodiments, the data from block 604 and block 608 may be transferred to blocks owned by shadow store 624 and the block converted to reference blocks that point to shadow store 624. However, in this example, reference block 606 points to shadow store 610. In at least one of the various embodiments, file cloning application 422 may be arranged to leave reference block 606 pointing to shadow store 616 rather than generate a reference block that points to shadow shore 624, or reference from shadow store block 612 to shadow store 624. This at least avoids the operational expense of transferring data from shadow store block 612 to shadow store 624. As well as, at least the expense and complexity of implementing a double indirection reference between shadow store block 612 and shadow store 624.

In at least one of the various embodiments, in this example, reference block 628 of the target inode 622 corresponds to reference block 606 in source inode 602 thus rather than generating a reference to pointer to shadow store 624, pointer 630 may be point to shadow store 610. In at least one of the various embodiments, reference counter 620 for shadow store block 612 is incremented. (e.g., resulting in a value of two) because in FIG. 6B two reference blocks (e.g., reference block 606 and reference block 628) are shown as referencing shadow store block 612.

In at least one of the various embodiments, in this example, two blocks (e.g., formerly data blocks now reference block 604 and reference block 608) may be transferred to shadow store 624. In at least one of the various embodiments, reference counter 626 may be generated to track the number of references to the shadow store blocks owned by shadow store 624. Based on this example, in at least one of the various embodiments, the two shadow store blocks owned by shadow store 624 are each referenced by reference blocks owned by inode 602 and inode 622 thus reference counter 626 includes two fields/cells both set to value of two.

Figure 7A:
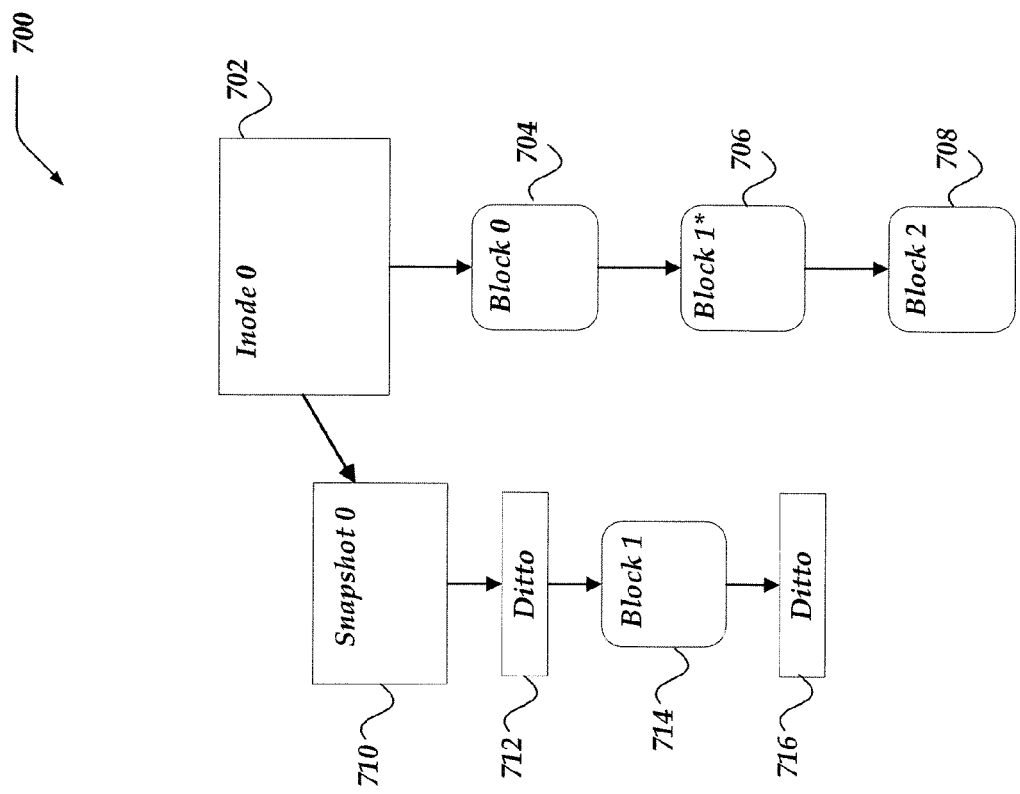
FIGS. 7A-7B illustrate logical schematics showing portions of a file cloning procedure of a source file having a snapshot in accordance with at least one of the various embodiments.
Figure 7B:
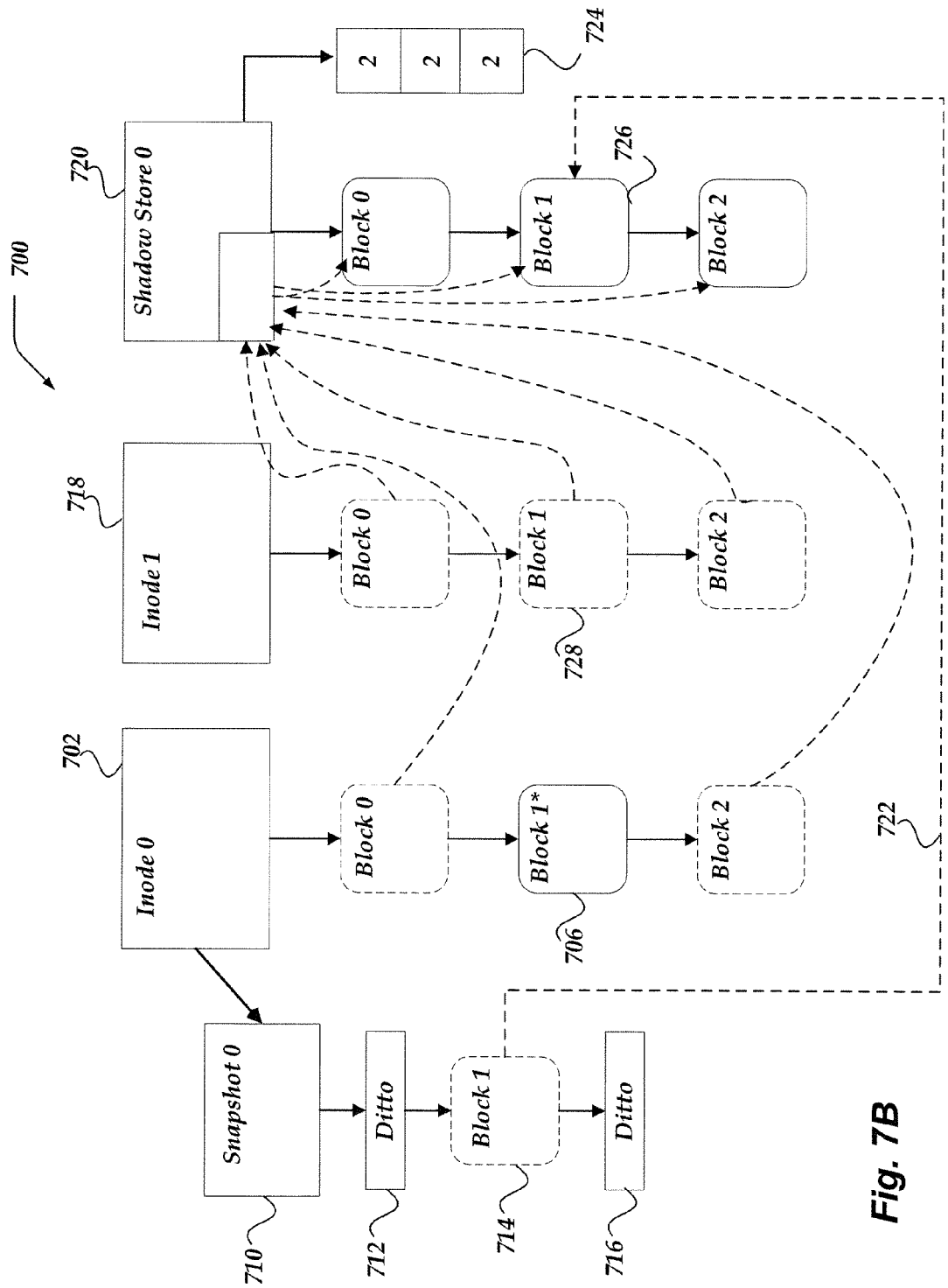

FIGS. 7A-7B illustrate for at least one of the various embodiments logical schematic 700 that shows portions of a file cloning procedure of a source file having a snapshot.

In at least one of the various embodiments, to guarantee that a source file and a target file are identical a file cloning application may acquire file system locks on the source file and target file to prevent users/process from accessing the files while the file cloning operation in process.

However, in at least one of the various embodiments, in high performance file systems, including distributed file system it may be impractical to acquire file locks on the files participating in a file cloning operation. In cases with a many users trying to access files such broad locking policies would impact too many users to be practicable. Also, in cases with very large files the file cloning process may to take a relatively long time causing significant performance impacts on users of the files.

In at least one of the various embodiments, to at least avoid some of the issues caused by extended locking of the source file, file cloning application 422 may employ "snapshots" that preserve the state of a file at a particular point of time.

In at least one of the various embodiments, snapshots may be employed to establish point-in-time consistency and guarantee access to the state/contents of a file as the file it existed at the time the snapshot was generated. Thus, in at least one of the various embodiments, if a file clone is generated from a snapshot, the target file (e.g., the clone) may be at least guaranteed to contain the same contents as the source file contained when the snapshot was generated.

In at least one of the various embodiments, file system application 424 may be configured to automatically generate snapshots for files based on rules based policies that may define how often snapshots may be generated and/or which files may be included in the snapshots.

In at least one of the various embodiments, file cloning application 422 may receive requests to generate clones based on previous/older snapshot versions. Or, in at least one of the various embodiments, a snapshot of the source file may be generated immediately before the file cloning operation. In some cases, immediate snapshots made for the purpose of supporting a file cloning operation may be discarded at the completion of the file cloning operation. Otherwise, the snapshot may remain in place subsequent to the file cloning operation.

In at least one of the various embodiments, cloning a file based on a snapshot of the source file may enable other process and users to access the head version of source file (the "live" version). In at least one of the various embodiments, file system application 422 may employ various well-known data structures to implement a snapshot, such as b-trees, or the like.

In at least one of the various embodiments, rather than maintain a copy of each data block owned by an inode, snapshots may be configured to copy data blocks from a source file if the source file data block is modified (e.g., updated or deleted). In at least one of the various embodiments, this may reduce the time to generate a snapshot and the amount of storage space required. For example, snapshots made of large static files may be generated quickly by establishing a snapshot timestamp without copying a significant amount of data.

In at least one of the various embodiments, data blocks may be copied to the snapshot as data blocks in the snapshot source file are modified. For short lived snapshots, in at least one of the various embodiments, snapshots may be generated and discarded before many data blocks are copied. Alternatively, in at least one of the various embodiments, depending on the popularity of the source file, the longer time a snapshot is active/available, the increased likelihood of data blocks being transferred to it.

In at least one of the various embodiments, the example embodiment depicted in FIG. 7A illustrates an inode (e.g., inode 702) having three data blocks (e.g., data block 704, data block 706, and data block 708). In at least one of the various embodiments, snapshot 710 may be a snapshot of the file represented by inode 702. In at least one of the various embodiments, snapshot 710 may include ditto block 712, data block 714, and ditto block 716.

In the example depicted by FIG. 7A, in at least one of the various embodiments, data block 714 has been transferred to snapshot 710 because data block 706 was modified subsequent to the generation of snapshot 710. In this example, data block 704 and data block 706 remain unchanged from the time snapshot 710 was generated thus they have not been copied to snapshot 710. In at least one of the various embodiments, ditto blocks and/or ditto regions may be used to indicate that a portion of the corresponding file remains unchanged. Likewise, data blocks, such as data block 714, that are in the snapshot may be copies of the data block as it was at the time the snapshot was generated. For example, in at least one of the various embodiments, data block 714 contains data that is a older/prior version than the data block 706.

FIG. 7B shows logical schematic 700, for at least one of the various embodiments, of completed a file cloning operation where a snapshot is employed to preserve a point-in-time state of the source file.

In at least one of the various embodiments, inode 718 may be clone of inode 702 based on snapshot 710 of inode 702. In at least one of the various embodiments, the generalized file cloning procedure described in conjunction with FIGS. 5A-5D may be employed. However, in at least one of the various embodiments, if snapshot 710 contains data blocks, those data blocks may the ones transferred into the shadow store.

In FIG. 7B, data block 714 maybe transferred to shadow store 720. Further, because block 728 in inode 718 corresponds to block 714, rather than data block 706, it may be arranged to reference shadow store 720. Note that in the example depicted in FIG. 7B, block 706 remains a data block rather than being converted to a reference block because the clone, inode 718 in the example, is based on the file version held in snapshot 710 rather than the head version of inode 702. Arrow 722 illustrates how block 714 may be transferred to block 726 in shadow store 720. Further, data block 714 may be replaced by a reference block pointing to shadow store block 726.

In at least one of the various embodiments, generating file clones based on snapshots may be reflected in the shadow store reference count. In this example, reference counter 724 tracks that shadow store block 726 (corresponding to the second cell in reference counter 724) has a two references pointing to it. In this example, the reference counter value of two indicates that reference block 728 is pointing to block 726 and reference block 714 is pointing to block 726. The other two cells in reference counter 724 also have a value of two corresponding to the reference blocks from inode 702 and inode 718 that reference shadow store blocks in shadow store 720.

Writing into File Clones

Figure 8:
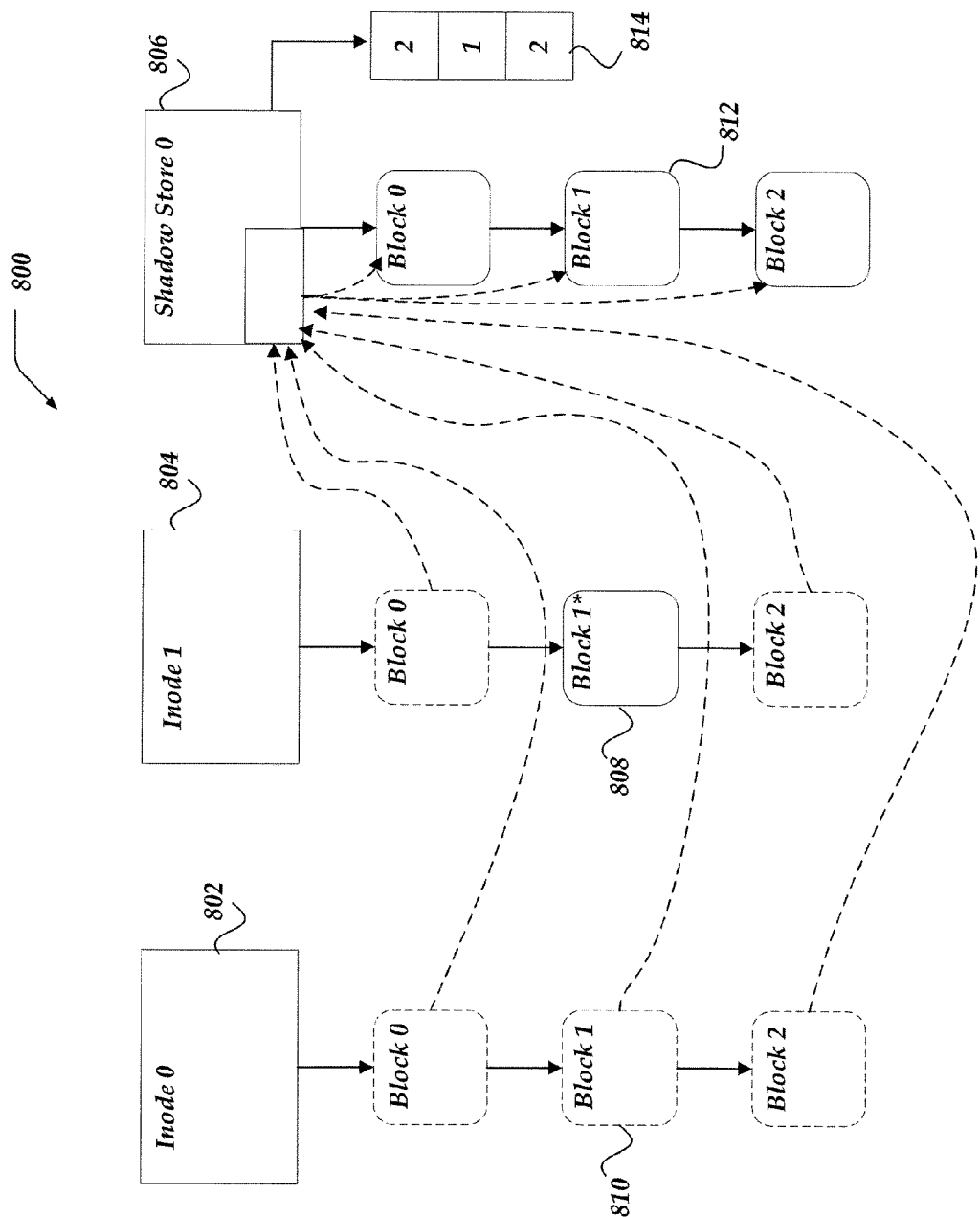
FIG. 8 illustrates a logical schematic showing portions of a write procedure in accordance with at least one of the various embodiments.

FIG. 8 depicts, for at least one of the various embodiments, logical schematic 800 showing result of a write operation. In particular, the example illustrates, for at least one of the various embodiments, how relevant data objects may be arranged subsequent a write into a file clone.

In this example, in at least one of the various embodiments, inode 802 and inode 804 may be file clones. As file clones they may include reference blocks to point to shadow store block in shadow store 806. In at least one of the various embodiments, if a user process tries to write to a portion of inode 804 that corresponds to reference block 808 (e.g., the block in the second position of inode 804), file system application 424 may copy data from shadow store block 812 into converting reference block 808 into a data block before (or as part of) the write operation. Because reference block 810 remains unchanged from the time the file clone was generated it continues to point to reference block 812 in shadow store 806.

In at least one of the various embodiments, as writes or modifications are made to the file clones, reference blocks that point to shadow store blocks may be converted to data block by copying the data in the corresponding shadow store blocks to the inodes.

Accordingly, in at least one of the various embodiments, shadow store reference counters such as reference counter 814 may track if shadow store blocks are have dependent reference blocks by at least decrementing the reference counts corresponding to each copied block.

Figure 9:
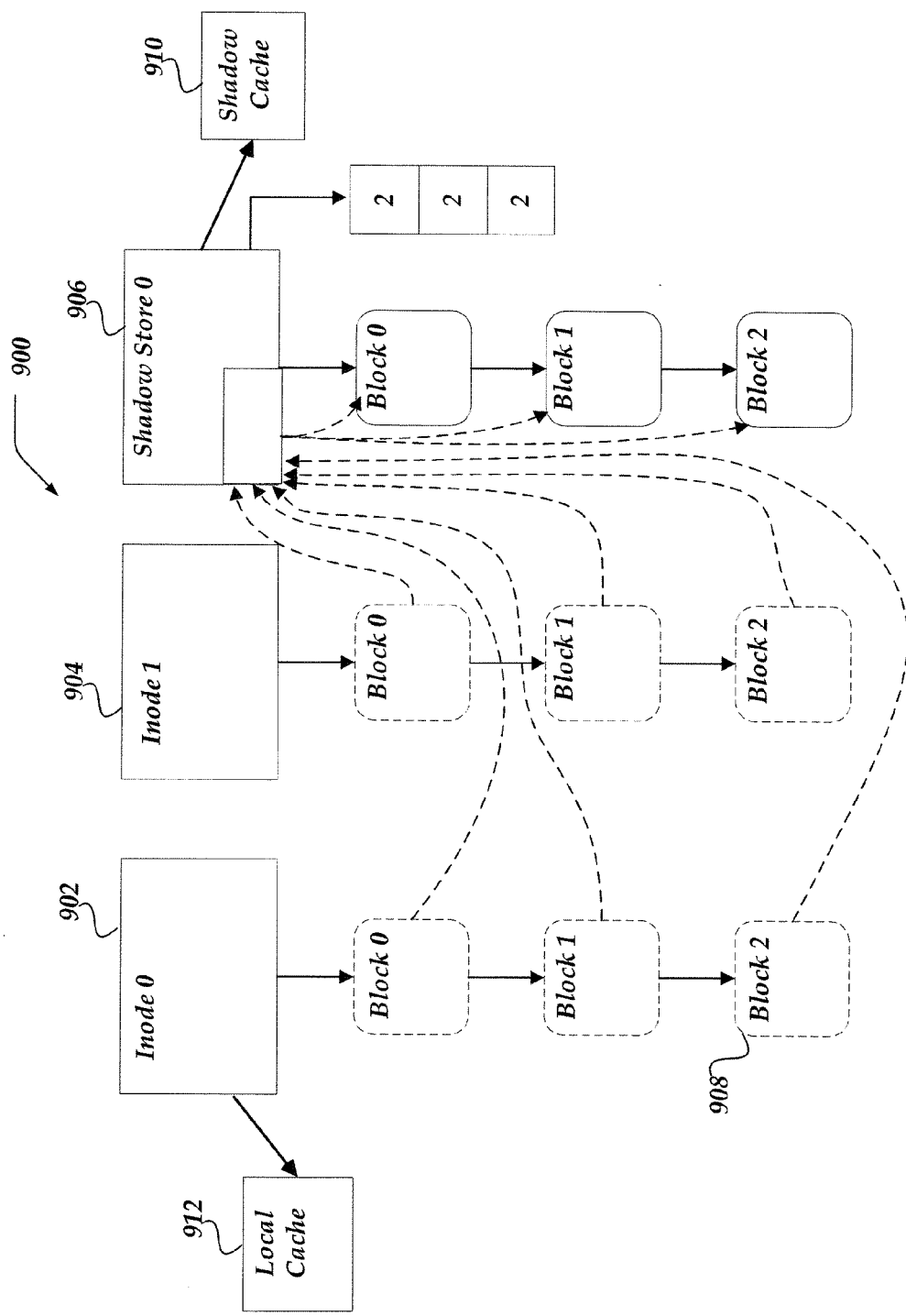
FIG. 9 illustrates a logical schematic showing portions of a read procedure in accordance with at least one of the various embodiments.

FIG. 9 illustrates for at least one of the various embodiments how the file system application may process read operations operation targeted at file clones. In at least one of the various embodiments, logical schematic 900 models a portion of a file system that includes two cloned inodes, inode 902 and inode 904, and the corresponding shadow store 906. As indicated in FIG. 9, for at least this example, each reference block in the cloned inodes point to shadow store blocks in shadow store 906.

In at least one of the various embodiments, for example, if file system application 424 receives a read request to read data that corresponds to reference block 908, the file system use the meta-data included in inode 902 to identify the reference block 908 targeted by the read request. Next, because reference block 908 points to a shadow store block owned by shadow store 906, the file system may follow the pointers and/or indirect references associated with reference block 908 to retrieve the data from the appropriate shadow store block for the read request.

During a read operation, in at least one of the various embodiments, the reference blocks in the inode may remain pointing to shadow store blocks in shadow store 906 because the data in the blocks remains unmodified after a read operation. Thus, in at least one of the various embodiments, the copy operations associated with a write are unnecessary.

In at least one of the various embodiments, caching may be employed by file system application to improve at least read performance. In at least one of the various embodiments, the inode being targeted by a read request may cache the read data locally in an in-memory cache.

In at least one of the various embodiments, inodes may be part of a multi-node/multi-server distributed file system. Accordingly, the shadow store may be on a different server and/or a different physical network device than the inodes. Thus, in at least one of the various embodiments, a local in-memory cache of read blocks and/or portions of read blocks may be employed to reduce the response time for subsequent reads of the same data. Each inode may generate it own in-memory cache which may lead to redundant data copies in the local caches. The redundant data may increase memory requirements for the file system.

Alternatively, in at least one of the various embodiments, the shadow store may generate an in-memory cache for each read request. In at least one of the various embodiments, this may eliminate storage redundancies that may arise if local inode caches are employed. In at least one of the various embodiments, the reduced redundancy may reduce the amount of memory consumed by the file system application.

Protection Groups/Forward Error Correction

In at least one of the various embodiments, data blocks may be grouped into file-based protection groups that may be arranged to support error correction and/or data validation.

In at least one of the various embodiments, file system application 424 may employ various forward error correction (FEC) techniques to protect against data loss that may be caused by device and/or system failure. In at least one of the various embodiments, various well-known techniques may be applied that offer different levels of protection. In at least one of the various embodiments, the particular FEC technique and arrangement of the protection groups may vary depending on operator/user preferences and according to the level protection desired.

Figure 10:
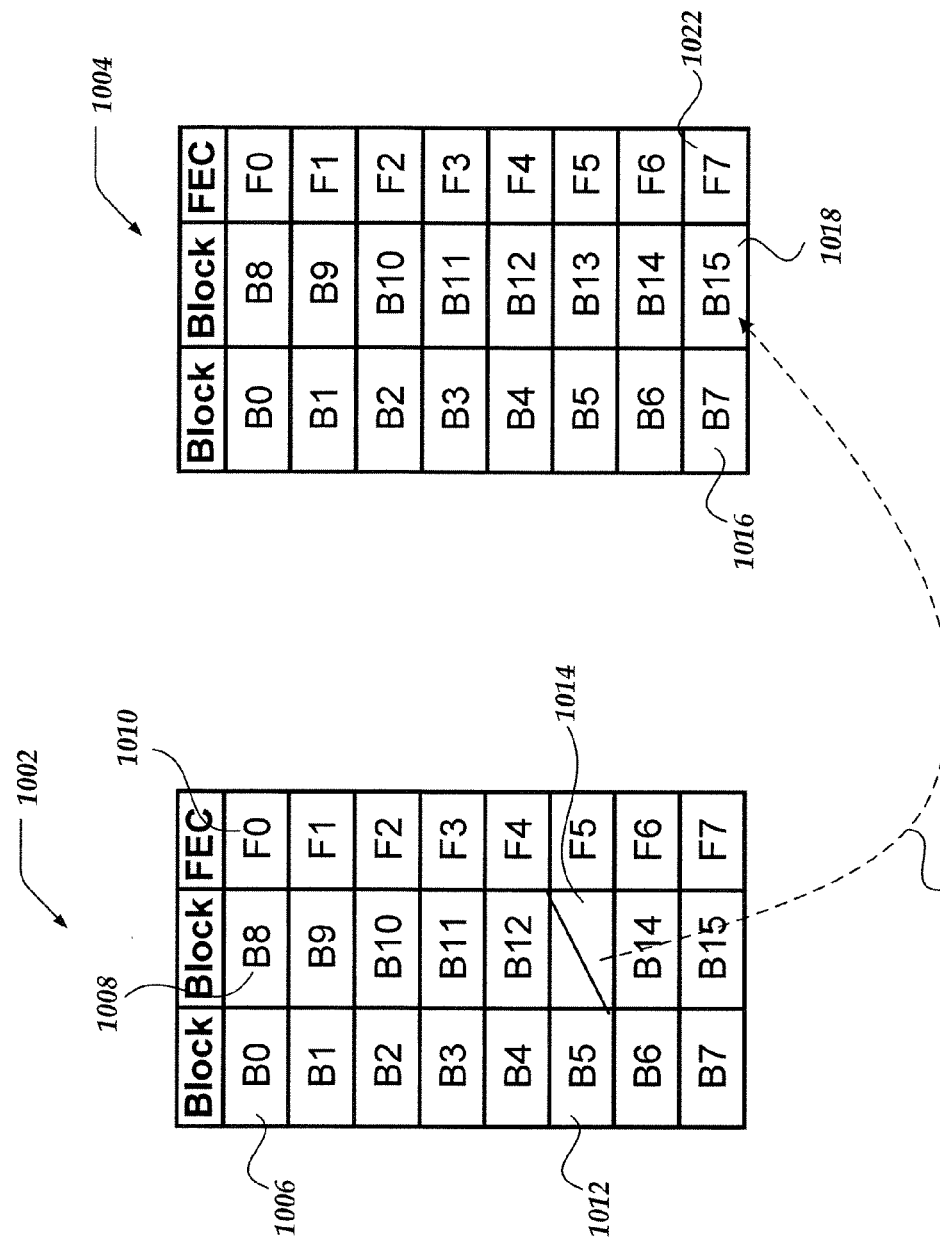
FIG. 10 illustrates a data structures associated with protection group error correction that may be used in accordance with at least one of the various embodiments.

FIG. 10 illustrates data structures for at least one of the various embodiments that may be employed by file system application 424 for FEC. A data structure such as FEC table 1002 may be employed to provide FEC for data blocks owned by an inode. Likewise, FEC table 1004 may be employed to provide FEC for shadow store blocks owned by a shadow store.

In at least one of the various embodiments, the FEC table in FIG. 10 may be arranged into two columns of data blocks and one column for protection data. This may provide single protection FEC. In at least one of the various embodiments, additional protection columns may be used to provide improved protection of the data in exchange for increased storage requirements.

In at least one of the various embodiments, sixteen data blocks and eight FEC blocks may be arranged in each table. The data blocks in tables 1002 and 1004 include labels B0, B1 . . . B15 used to indicate the position of the blocks within the tables. Also, the FEC blocks are labeled F0, F1, . . . , F7. The labels do not represent the data in the block, thus block B0 in table 1002 is unlikely to have the same data/contents as block B0 in table 1004. (Each table has a B0 block and they usually include different data.) In at least one of the various embodiments, each row in the tables may comprise a protection group.

In at least one of the various embodiments, one type of FEC may comprise Exclusive-Or'ing (XOR) each data block in a protection group with each to producing the contents of a FEC block. Thus, in at least one of the various embodiments, if one data block in the protection group is lost or corrupted, the well-known Boolean logic properties of the XOR operation enable the remaining data block and the FEC block in the protection group to be used to reproduce the contents of one lost or corrupt block.

For example, in at least one of the various embodiments, block 1006 XOR'd with the block 1008 generates FEC block 1010 (e.g., B0$\otimes$B8=F0). If the data in block B0 1006 is lost or corrupted XOR'ing the surviving block, B8 1008 with the FEC block 1010 (F0) regenerates the data for block B0 1006 (e.g., F0$\otimes$B8=B0). Likewise, if the data in block 1008 (B8) is lost or corrupted the data in block 1006 (B0) may be XOR'd with FEC block 1010 (F0) to reproduce the data for block 1008 (B8) (e.g., F0$\otimes$B0=B8).

In at least one of the various embodiments, if a data block in a protection group is a reference block pointing to a shadow store block, the reference block may not be used to the generate the FEC block for the protection group. In at least one of the various embodiments, reference blocks in protection groups may be treated as zero valued blocks.

For example, in at least one of the various embodiments, in FEC table 1002, block 1012 (B5) may be a data block and block 1014 may be a reference block (indicated in the figure by the empty table cell with a "slash" through it). In this case, in at least one of the various embodiments, the FEC block that corresponds to block 1012 may be generated by XOR'ing block 1012 with a zero block (e.g., B2$\otimes$0=F0) resulting a FEC block (F2) that has the same value as the data block based on the properties of XOR (e.g., B2$\otimes$0=B2).

In at least one of the various embodiments, blocks in a protection group that reference a shadow store block, point a shadow store block (data block) in the shadow store protection group. In at least one of the various embodiments, the shadow store protection group may be used to provide protection to the shadow store blocks rather than the protection groups associated with other inodes.

For example, in at least one of the various embodiments, since block 1014 is a reference block, pointer 1020 may reference a particular shadow store block in the shadow store protection group. In this example, in at least one of the various embodiments, pointer 1020 points to shadow store block 1018 in the shadow store protection group. Thus, data protection for the data pointed to reference block 1014 may be provided by XOR'ing block 1016 with block 1018 to produce FEC block 1022 that may be stored in a shadow store protection group.

In at least one of the various embodiments, in a distributed file system each element (e.g., data blocks and FEC blocks) comprising a protection group may be stored on a separate node (network device or blade). Further, in at least one of the various embodiments, protection group elements may be stored on separate disk drives on the same node.

Delta Locks

Figure 11:
FIG. 11 shows an embodiment of file system locks in accordance with the various embodiments.

FIG. 11 illustrates, for at least one of the various embodiments, relationships between file/memory lock types (e.g., delta read locks, delta write locks, shared locks, and exclusive locks). Table 1100 shows how lock types may be compatible with other lock types. In at least one of the various embodiments, a delta read lock may require that the non-delta data of the locked resource remains undisturbed (e.g., read-only). Accordingly, delta read locks may be compatible with other delta read locks, delta write locks, and shared locks because these locks may ensure that the non-delta data of a locked resource remains unchanged.

As shown in table 1100, delta write locks may be compatible with other delta write locks and delta read locks. Writers holding delta write locks may modify delta data and may not modify non-delta data. This behavior may be incompatible shared locks because shared locks may not recognize a distinction between delta and non-delta data. Rather, shared locks may require that the entire resource remain undisturbed. Further, as expected, exclusive locks may be incompatible with all other locks because an exclusive lock may signal that the lock holder can write or read the entire resource and that the resource may not be altered by other writers or readers. Note, that in at least one of the various embodiments, an exclusive lock may lock all the resource data without considering whether the resource may have been partitioned into delta data or non-delta data.

Accordingly, in at least one of the various embodiments, a writer may immediately obtain a delta write lock on an inode if all other locks on the inode may be delta write locks and/or delta read locks. If a writer tries to obtain a delta write lock on an inode where a reader has already obtained a shared lock the writer may have to wait until the shared lock is released before obtaining the delta write lock. However, in at least one of the various embodiments, as depicted in table 1100, a reader trying to obtain a delta read lock may proceed without delay as long as there is not an exclusive lock on the targeted inode.

In at least one of the various embodiments, enabling multiple writers to concurrently obtain delta write locks on the same inode may enable multiple writers to concurrently write to the same file. In at least one of the various embodiments, writers may obtain concurrent delta write locks on an inode to execute concurrent writes to the file if the writers intend to modify separate portions of the file. If the file and/or inode, is under a lock type incompatible with delta writes (e.g., shared locks, exclusive locks) and/or if another writer with a lock may be writing to the same part of the file (the same data blocks), the writer may be unable to obtain a delta write lock for writing. Accordingly, if a delta write lock may not be obtained, a writer may have to wait until the incompatible lock(s) on the file are released by their respective lock holders.

In at least one of the various embodiments, at least the reference counters used to track number of reference blocks that may be pointing to shadow store blocks may be implemented using delta data. Thus, in at least one of the various embodiments, processes may take delta write locks on the reference counter data structure when incrementing or decrementing the counts. This, at least enables one or more processes or threads to concurrently decrement and/or incremented the reference counts using journals delta.

In at least one of the various embodiments, each process decrementing a reference count may record a "−1" in the delta journal. Likewise, in at least one of the various embodiments, each process incrementing a reference counter may record a "+1" in the delta journal. Later, in at least one of the embodiments, a house keeping process may sum the journal delta to determine the current value of the reference counter.

Generalized Operations

Figure 12:
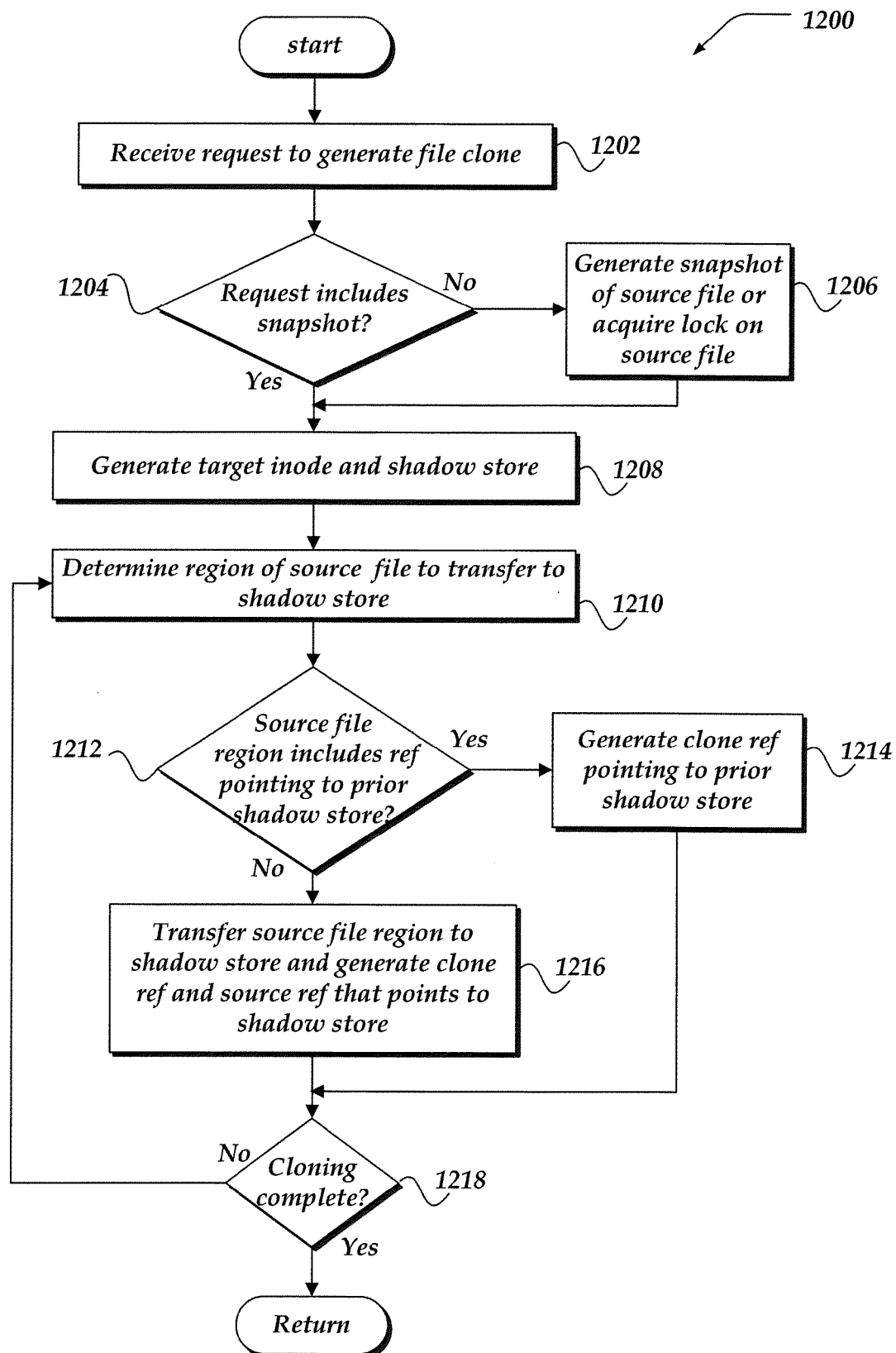
FIG. 12 shows an overview flowchart for a process for generating a file clone in accordance with at least one of the various embodiments.

FIG. 12 shows a flowchart for process 1200 for generating a file clone in accordance with at least one of the various embodiments. After a start block, in at least one of the various embodiments, at block 1202, a file cloning application may receive a request to generate a file clone.

At decision block 1204, in at least one of the various embodiments, if the request to generate a file clone includes a snapshot, control may move to block 1208. Otherwise, in at least one of the various embodiments, control may move block 1206.

In at least one of the various embodiments, if a request identifies a snapshot that includes the source file to use as a basis for generating in the file clone that file clone may be based off of the identified snapshot. In at least one of the various embodiments, the relevant snapshot may be determined by an identifier included with the file cloning request. Or, in at least one of the various embodiments, the relevant snapshot may be determined by applying rule based policies and/or configuration settings.

At block 1206, in at least one of the various embodiments, generate a snapshot that includes the source file or acquire a lock on the source file. In at least one of the various embodiments, file system application 424 may be configured to automatically generate a snapshot that includes the source file if the initial file cloning request does not identify a snapshot. In these cases, in at least one of the various embodiments, the file system application 425 may generate a snapshot that preserves the state of the source file.

Alternatively, in at least one of the various embodiments, the file cloning application may acquire a lock on the source file that the contents of the file from changing during the file cloning process.

At block 1208, in at least one of the various embodiments, the file cloning application may generate a target inode and a shadow store. In at least one of the various embodiments, the target inode may be the result of the file cloning operation. In at least one of the various embodiments, one or more target inodes may be generated based on parameters in the received request. For example, a user may request to create multiple clones of the same source file.

In at least one of the various embodiments, the target inode (s) and the shadow store may be generated absent reference blocks and/or data blocks.

At block 1210, in at least one of the various embodiments, the file cloning application may determine the region of the source file to transfer to the shadow store. In at least one of the various embodiments, the file cloning application may advance through the data blocks owned by the source file to determine the source file regions. In at least one of the various embodiments, source file data regions may include one or more blocks. Also, in at least one of the various embodiments, source data regions may include partial data blocks.

In at least one of the various embodiments, if a snapshot is being used, the file cloning application may check the relevant snapshot for source file data blocks to transfer to the shadow store. In at least one of the various embodiments, if relevant data blocks may be found in relevant snapshots, those data blocks may be transferred to the shadow store. Alternatively, if data blocks may be absent from the snapshot the file cloning application may transfer the data block directly from the source file.

At decision block 1212, in at least one of the various embodiments, if the source file data region being transferred includes reference blocks pointing to another shadow store, control may move to block 1214. Otherwise, in at least one of the various embodiments, control may move to block 1216.

At block 1214, in at least one of the various embodiments, the file cloning application may generate reference blocks corresponding to the reference blocks found in source file data region. In at least one of the various embodiments, the generated reference blocks may include pointers to shadow store blocks in the other shadow store. Further, in at least one of the various embodiments, the generated reference blocks may be attached and/or associated with the target inode(s) using well-known data structures.

At block 1216, in at least one of the various embodiments, the file cloning application may transfer the determined source file data regions to the shadow store and generate corresponding reference blocks in the source file and target file(s). In at least one of the various embodiments, the data blocks in the source file may be replaced by reference blocks that may point to corresponding shadow store blocks in the shadow store. Similarly, other reference blocks that point to the corresponding shadow store blocks in the shadow store may be generated for each target file.

At decision block 1218, in at least one of the various embodiments, if source file data regions remain to be cloned, control may loop back to block 1210. Otherwise, in at least one of the various embodiments, control may be returned to a calling process.

Figure 13:
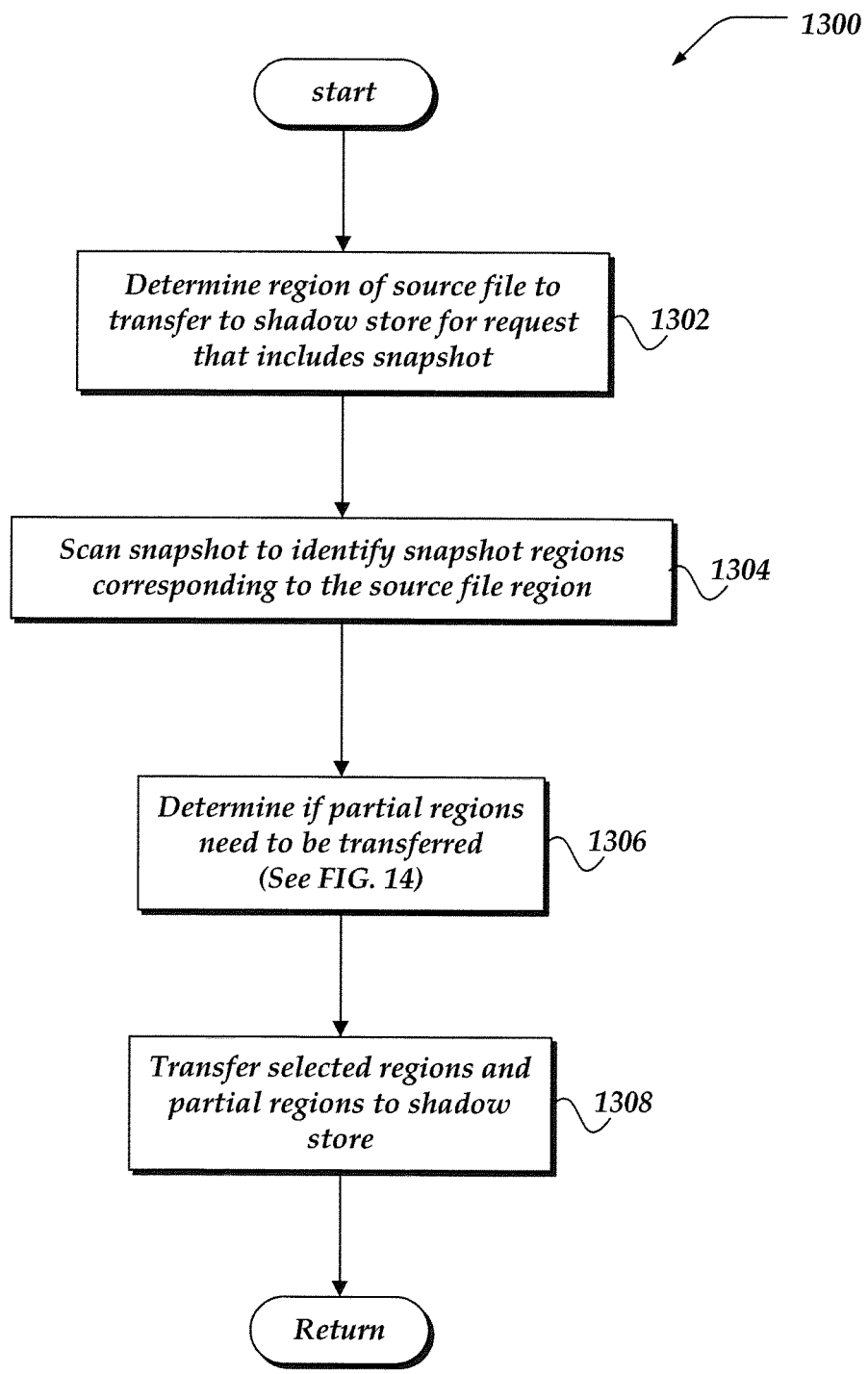
FIG. 13 shows a flowchart for a process for determining source file regions for transferring to a shadow store in accordance with at least one of the various embodiments.

FIG. 13 shows a flowchart for process 1300 for determining the source file data regions for transferring to a shadow store in accordance with at least one of the various embodiments. After a start block at block 1302, in at least one of the various embodiments, determine the data region of the source file to transfer to the shadow store for a file cloning request that designates a snapshot.

At block 1304, in at least one of the various embodiments, the file cloning application may examine the snapshot to identify snapshot regions that may be included in the source file data region. For example, if the source file data region includes a range of data blocks, such as block 0 through block 3, the snapshot may be examined to determine if it includes data blocks corresponding to the source file block 0-3.

In at least one of the various embodiments, if the subsequent to the creation of the snapshot, data blocks in the source file were modified, versions of the data blocks that correspond to the point-in-time the snapshot was generated may be preserved in the snapshot. In at least one of the various embodiments, the file cloning application may examine the snapshot regions that correspond to the source file data region. In at least one of the various embodiments, if corresponding data in the snapshot regions is discovered, the file cloning application may be determined that the data blocks in the snapshot may relevant to the cloning operation. The newer data blocks that may have been modified subsequent to the point-in-time the snapshot was generated may be excluded from the file clones.

At block 1306, in at least one of the various embodiments, determine if partial regions may be transferred to the shadow store. In at least one of the various embodiments, a snapshot may include partial regions corresponding to partial regions in the source file. In at least one of the various embodiments, partial regions may include partial data blocks.

In at least one of the various embodiments, because the data region may be small the file cloning application may analyze the partial regions to determine if the partial region should be transferred to the shadow store.

At block 1308, in at least one of the various embodiments, the file cloning application may transfer the data regions and/or partial regions to the shadow store. In at least one of the various embodiments, if the determined data regions have corresponding data in the snapshot, data from the snapshot may be transferred to the shadow store. Otherwise, in at least one of the various embodiments, the source file data regions may be transferred to the shadow store from the source file rather than the snapshot. Next, control may be returned to a calling process.

Figure 14:
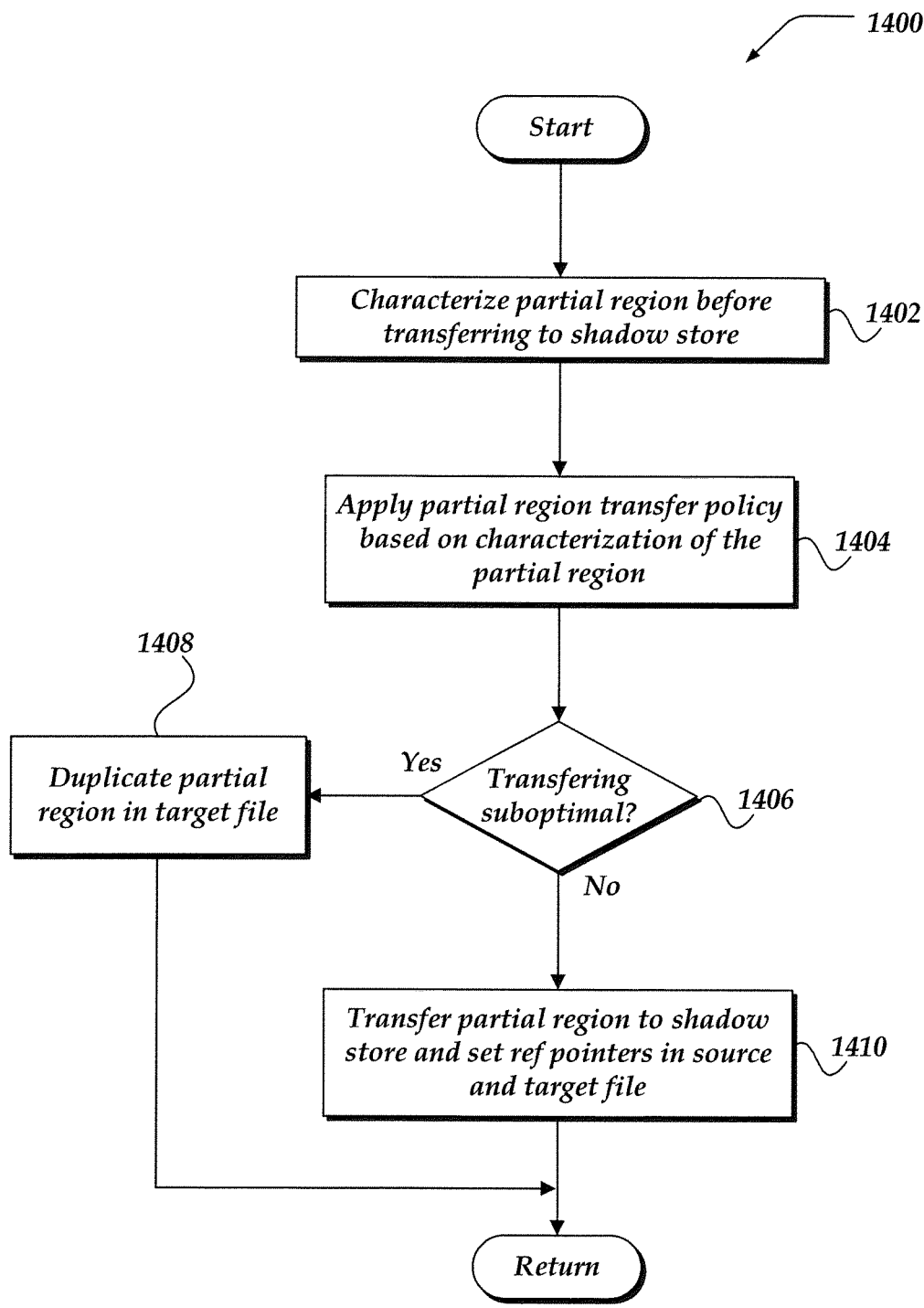
FIG. 14 shows a flowchart for a process for transferring partial blocks of a, file to a shadow store in accordance with at least one of the various embodiments.

FIG. 14 shows a flowchart for process 1400 for transferring partial regions of a file to a shadow store in accordance with at least one of the various embodiments. After a start block, at block 1402, in at least one of the various embodiments, the file cloning application may characterize a partial region before determining if it may be transferred to a shadow store.

At block 1404, in at least one of the various embodiments, apply the partial region transfer policy based on the characterization of the partial region. In at least one of the various embodiments, the file cloning application may identify partial regions that may be cloned.

In at least one of the various embodiments, the size of a partial region may indicate that it may be more efficient to copy the data in the partial region directly to the target files rather to a shadow store. For small regions this may be more efficient than transferring the data to a shadow store by avoiding the overhead of generating the corresponding reference blocks in the source file and the target file, reference counters, or the like.

In at least one of the various embodiments, a variety of factors, including configuration properties, system properties, application properties, or the like, may be considered if determining if partial regions should be transferred to a shadow store. In at least one of the various embodiments, properties considered may include, region size thresholds, number of nodes, average file size, source file size, average number connections/users, popularity of source file, popularity of the partial region, or the like.

In at least one of the various embodiments, the particular properties, rules, threshold values, or the like, may be stored in configuration files/databases, received from user-interfaces, determined based on policy rules/formals, or the like.

At decision block 1406, in at least one of the various embodiments, if transferring the partial region to the shadow store is determined to be suboptimal control may move to block 1408. Otherwise, in at least one of the various embodiments, control may move to block 1410.

At block 1408, in at least one of the various embodiments, the file cloning application may copy a duplicate of the partial region to the target files. In at least one of the various embodiments, if the partial region may be copied to the target files the file cloning application may not generate reference blocks for the source file inode and for the target file inode. If the data in the partial regions is duplicated, generating corresponding reference blocks may be unnecessary. Also, in at least one of the various embodiments, if the partial region is not transferred to the shadow store, the reference counters in the shadow may remain unchanged.

At block 1410, in at least one of the various embodiments, the file cloning application may transfer the partial region to the shadow store and generate corresponding reference blocks in the source file and the target files. Further, in at least one of the various embodiments, if the partial region may be transferred to the shadow pointer the corresponding reference counters may be generated to track the number of references made to the partial regions.

Figure 15:
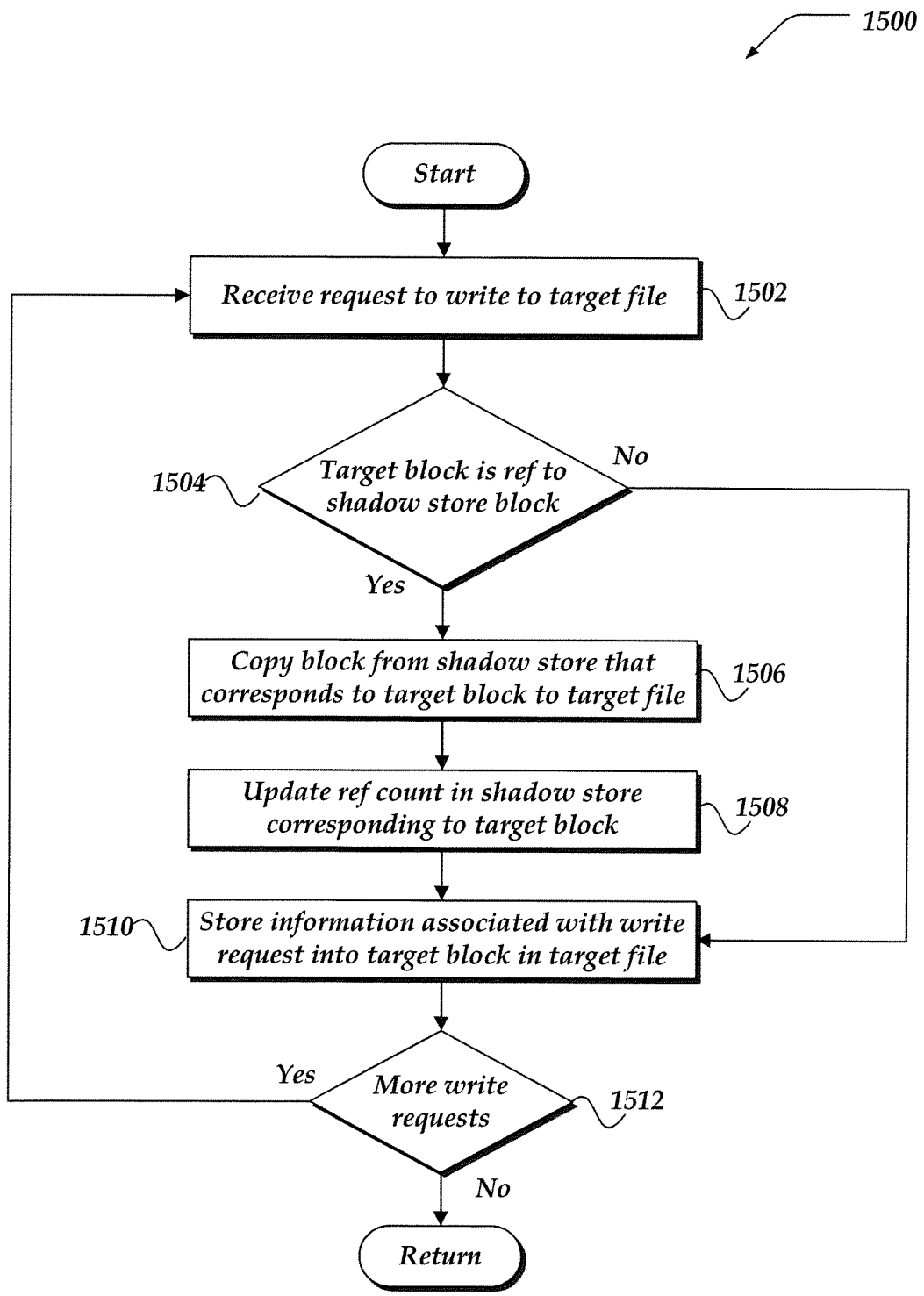
FIG. 15 shows a flowchart for a process for writing to a file clone in accordance with at least one of the various embodiments.

FIG. 15 shows a flowchart for process 1500 for writing to a file clone in accordance with at least one of the various embodiments. After a start block, at block 1502, in at least one of the various embodiments, a request to write to a target file may be received. In at least one of the various embodiments, a write request may include sufficient information to identify the portion of the target file that may be affected by the write operation. For example, in at least one of the various embodiments, the write request may include an inode ID, a buffer of data, an offset into the file, or the like. Or, in at least one of the various embodiments, the write request may include a buffer of data an indicator that the data should be appended to the file at the end.

At decision block 1504, in at least one of the various embodiments, if the block that is the target of write may be a reference block pointing to a shadow store, control may move to block 1506. Otherwise, in at least one of the various embodiments, control may move to block 1510.

In at least one of the various embodiments, if the write request may resolve to an append operation, the shadow store may not be involved. This may be because the write may generate a new data block that may be appended to the existing blocks owned by the target file that does not affect reference blocks that may point to a shadow store.

In at least one of the various embodiments, if the write request resolves to a reference block in the target file, the write request may be targeted to modify a region of the target file that is currently stored in the shadow store.

At block 1506, in at least one of the various embodiments, the file cloning application may copy the contents/data from the shadow store block that corresponds to the target block into a data block in the target file (replacing the reference block with the data block).

At block 1508, in at least one of the various embodiments, the file cloning application may update the reference counters in the shadow store corresponding to the target block.

In at least one of the various embodiments, reference blocks in the target file may be replaced by data blocks that include data copied from the shadow store. Thus, in at least one of the various embodiments, reference counters in the shadow stores may be decremented to reflect that the targeted file may no longer be referencing the shadow store blocks that were copied.

In at least one of the various embodiments, if a shadow store reference count for a shadow store block reaches zero, the data block may be released by the shadow store because no remaining file clone reference block point the shadow store block.

In at least one of the various embodiments, shadow store blocks determined to have reference counts of zero may be queued for garbage collection/clean-up by a house keeping process rather than being cleaned up immediately after the reference counts reach zero.

At block 1510, in at least one of the various embodiments, the write may be executed by storing the write data into the appropriate data block in the target file. In at least one of the various embodiments, at this point the shadow store block and the target file block have different content values and have different state.

At decision block 1512, in at least one of the various embodiments, if there may be additional write requests, control may loop back to block 1502. Otherwise, in at least one of the various embodiments, control may be returned to a calling process.

Figure 16:
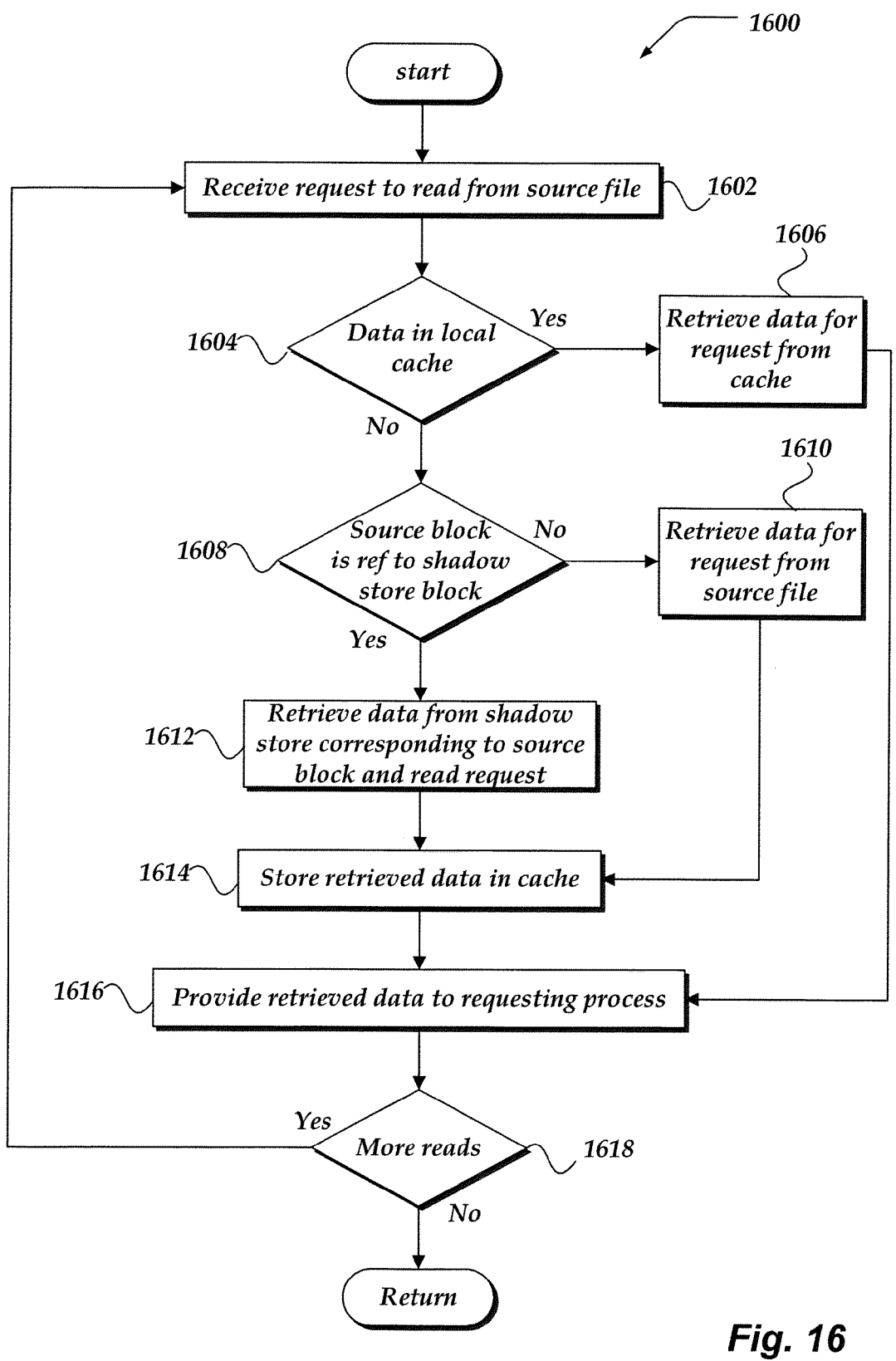
FIG. 16 shows a flowchart for a process for reading from a file clone in accordance with at least one of the various embodiments.

FIG. 16 shows a flowchart for process 1600 for reading data from a file clone in accordance with at least one of the various embodiments. After a start block, at block 1602, in at least one of the various embodiments, a request to read data from a source file may be received.

At decision block 1604, in at least one of the various embodiments, if the data for the read request is in the local cache control may move to block 1606. Otherwise, in at least one of the various embodiments, control may move to decision block 1608.

At decision block 1606, in at least one of the various embodiments, the file system application may retrieve the data for the read request from the local cache.

In at least one of the various embodiments, if the data for the read request is found in the local cache, it may be used directly avoiding the overhead of retrieving the data from a shadow store.

At decision block 1608, in at least one of the various embodiments, if the source block is a reference block pointing to a shadow store block, control may move to block 1612. Otherwise, in at least one of the various embodiments, control may move to block 1610.

At block 1610, in at least one of the various embodiments, retrieve the data corresponding to the read request the source file. In at least one of the various embodiments, if the read resolves to data block that is not referencing a shadow store that data may retrieved from the source file data blocks.

At block 1612, in at least one of the various embodiments, retrieve the data corresponding to the read request from the shadow store. In at least one of the various embodiments, because the read request resolves to a reference block the data for the read may be located in a shadow store. Thus, in at least one of the various embodiments, the reference block pointers may be followed to determine the shadow store that may have the requested data held in a shadow store block. Further, in at least one of the various embodiment, because this is a read request, the content of the shadow store block may remain unchanged. Accordingly, in at least one of the various embodiments, the reference blocks in the source file that correspond to the read request may remain in place.

At block 1614, in at least one of the various embodiments, the retrieved data may be stored in the appropriate cache. In at least one of the various embodiments, data retrieved from the shadow store and/or the source file in response to the read request may be stored in a in-memory cache that may be local to the source file inode.

Also, in at least one of the various embodiments, an in-memory cache may be generated local to the shadow store.

At block 1616, in at least one of the various embodiments, the retrieved data may be provided to the user or process that initiated the read request.

At decision block 1618, in at least one of the various embodiments, if more read requests may remain to be processed, control may loop back to block 1602.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, or the like.

What is claimed as new and desired to be protected by Letters Patent of the United States is:

1. A method for cloning files in a file system for a plurality of network devices, wherein at least one network device is operative to perform actions, comprising:
   in response to a request to clone a source file, generating at least one target file and generating at least one shadow store unless at least one existing shadow store is determined to be available;
   determining each data region in a set of data regions that comprise the source file wherein a data region in the set of data regions is a set of block address ranges;
   determining whether each data region in the source file is a source file data region or a shadow store data region;
   transferring each source file data block in each determined source file data region in the source file to the at least one shadow store without transferring preexisting reference blocks in the shadow store data regions to the at least one shadow store;
   generating a shadow store block in the at least one shadow store corresponding to each transferred source file data block;
   generating at least one reference block in a new shadow store data region for the source file that corresponds to each shadow store block, wherein each reference block replaces each corresponding source file data block in the source file;
   generating at least one other reference block in the new shadow store data region corresponding to each shadow store block that is included in each target file; and
   incrementing at least one reference count in the shadow store that corresponds to each generated reference block and each shadow store data region, wherein each target file is a clone of the source file that includes at least one reference block that references the shadow store.

2. The method of claim 1, further comprising, if a snapshot identifier is absent from the request to clone the source file, generating a snapshot of the source file that is based on at least a state of the source file at a time of the request.

3. The method of claim 1, further comprising if the request to clone the source file is associated with a snapshot that includes at least one data block older than a corresponding data block in at least one determined data region of the source file, transferring the at least one older data block from the snapshot to the at least one shadow store.

4. The method of claim 1, further comprising:
   receiving a request to write data to a file in the file system; and
   if the received request to write data to the file resolves to a reference block instead of a data block in the file, performing further actions, including:
      copying the shadow store block pointed to by the reference block in the file and converting it into a new data block in the file;
      decrementing the reference counter in the shadow store that corresponds to the copied shadow store block; and
      storing the write data into the new data block in the file.

5. The method of claim 1, further comprising:
   receiving a request to read data from a file in the file system; and
   if the request to read data from the file resolves to at least one reference block in the file instead of a data block in the file, performing further actions, retrieving the requested read data from the at least one shadow store block corresponding to the at least one reference block.

6. The method of claim 1, further comprising if a partial data block is both included in the determined data region of the source file and a size of the partial data block is less than a defined threshold, copying the partial data block to each target file.

7. The method of claim 1, further comprising if a snapshot identifier is absent from the request to clone the source file, using a current version of the source file to generate the target file.

8. The method of claim 1, further comprising, if the source file's determined data region of metadata consists entirely of reference blocks, generating a corresponding reference block in each target file without generating any new shadow store or shadow store block.

9. A network device for cloning files in a file system for a plurality of network devices over a network, comprising:
   a memory for storing data and instructions;
   a processor, wherein the processor is arranged to execute instructions that enable actions, including:
      in response to a request to clone a source file, generating at least one target file and generating at least one shadow store unless at least one existing shadow store is determined to be available;
      determining each data region in a set of data regions that comprise the source file wherein a data region in the set of data regions is a set of block address ranges;
      determining whether each data region in the source file is a source file data region or a shadow store data region;
      transferring each source file data block in each determined source file data region in the source file to the at least one shadow store without transferring preexisting reference blocks in the shadow store data regions to the at least one shadow store;
      generating a shadow store block in the at least one shadow store corresponding to each transferred source file data block;
      generating at least one reference block in a new shadow store data region for the source file that corresponds to each shadow store block, wherein each reference block replaces each corresponding source file data block in the source file;
      generating at least one other reference block in the new shadow store data region corresponding to each shadow store block that is included in each target file; and
      incrementing at least one reference count in the shadow store that corresponds to each generated reference block and each shadow store data region, wherein each target file is a clone of the source file that includes at least one reference block that references the shadow store.

10. The network device of claim 9, further comprising, if a snapshot identifier is absent from the request to clone the source file, generating a snapshot of the source file that is based on at least a state of the source file at a time of the request.

11. The network device of claim 9, further comprising if the request to clone the source file is associated with a snapshot that includes at least one data block older than a corresponding data block in at least one determined data region of the source file, transferring the at least one older data block from the snapshot to the at least one shadow store.

12. The network device of claim 9, further comprising:
receiving a request to write data to a file in the file system; and
if the received request to write data to the file resolves to a reference block instead of a data block in the file, performing further actions, including:
copying the shadow store block pointed to by the reference block in the file and converting it into a new data block in the file;
decrementing the reference counter in the shadow store that corresponds to the copied shadow store block; and
storing the write data into the new data block in the file.

13. The network device of claim 9, further comprising:
receiving a request to read data from a file in the file system; and
if the request to read data from the file resolves to at least one reference block in the file instead of a data block in the file, performing further actions, retrieving the requested read data from the at least one shadow store block corresponding to the at least one reference block.

14. The network device of claim 9, further comprising if a partial data block is both included in the determined data region of the source file and a size of the partial data block is less than a defined threshold, copying the partial data block to each target file.

15. The network device of claim 9, further comprising if a snapshot identifier is absent from the request to clone the source file, using a current version of the source file to generate the target file.

16. The network device of claim 9, further comprising, if the source file's determined data region of metadata consists entirely of reference blocks, generating a corresponding reference block in each target file without generating any new shadow store or shadow store block.

17. A processor readable non-transitory storage media with instructions for cloning files in a file system for a plurality of network devices over a network, wherein execution of the instructions by a processor enables actions, comprising:
in response to a request to clone a source file, generating at least one target file and generating at least one shadow store unless at least one existing shadow store is determined to be available;
determining each data region in a set of data regions that comprise the source file wherein a data region in the set of data regions is a set of block address ranges;
determining whether each data region in the source file is a source file data region or a shadow store data region;
transferring each source file data block in each determined source file data region in the source file to the at least one shadow store without transferring preexisting reference blocks in the shadow store data regions to the at least one shadow store;
generating a shadow store block in the at least one shadow store corresponding to each transferred source file data block;
generating at least one reference block in a new shadow store data region for the source file that corresponds to each shadow store block, wherein each reference block replaces each corresponding source file data block in the source file;
generating at least one other reference block in the new shadow store data region corresponding to each shadow store block that is included in each target file; and
incrementing at least one reference count in the shadow store that corresponds to each generated reference block and each shadow store data region, wherein each target file is a clone of the source file that includes at least one reference block that references the shadow store.

18. The media of claim 17, further comprising, if a snapshot identifier is absent from the request to clone the source file, generating a snapshot of the source file that is based on at least a state of the source file at a time of the request.

19. The media of claim 17, further comprising if the request to clone the source file is associated with a snapshot that includes at least one data block older than a corresponding data block in at least one determined data region of the source file, transferring the at least one older data block from the snapshot to the at least one shadow store.

20. The media of claim 17, further comprising:
receiving a request to write data to a file in the file system; and
if the received request to write data to the file resolves to a reference block instead of a data block in the file, performing further actions, including:
copying the shadow store block pointed to by the reference block in the file and converting it into a new data block in the file;
decrementing the reference counter in the shadow store that corresponds to the copied shadow store block; and
storing the write data into the new data block in the file.

21. The media of claim 17, further comprising:
receiving a request to read data from a file in the file system; and
if the request to read data from the file resolves to at least one reference block in the file instead of a data block in the file, performing further actions, retrieving the requested read data from the at least one shadow store block corresponding to the at least one reference block.

22. The media of claim 17, further comprising if a partial data block is both included in the determined data region of the source file and a size of the partial data block is less than a defined threshold, copying the partial data block to each target file.

23. The media of claim 17, further comprising if a snapshot identifier is absent from the request to clone the source file, using a current version of the source file to generate the target file.

24. The media of claim 17, further comprising, if the source file's determined data region of metadata consists entirely of reference blocks, generating a corresponding reference block in each target file without generating any new shadow store or shadow store block.

* * * * *